(12) United States Patent
Hwang et al.

(10) Patent No.: US 12,511,033 B2
(45) Date of Patent: Dec. 30, 2025

(54) PERSONALIZED ELECTRONIC DEVICE INFERRING USER INPUT, AND METHOD FOR CONTROLLING SAME

(71) Applicant: SAMSUNG ELECTRONICS CO., LTD., Suwon-si (KR)

(72) Inventors: Jinyoung Hwang, Suwon-si (KR); Dongchan Kim, Suwon-si (KR); Dongnam Byun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/221,288

(22) Filed: Jul. 12, 2023

(65) Prior Publication Data

US 2023/0359348 A1    Nov. 9, 2023

Related U.S. Application Data

(63) Continuation of application No. PCT/KR2021/016889, filed on Nov. 17, 2021.

(30) Foreign Application Priority Data

Jan. 12, 2021    (KR) .................. 10-2021-0004241

(51) Int. Cl.
   *G06F 3/04883*    (2022.01)
   *G06F 3/041*    (2006.01)

(52) U.S. Cl.
   CPC ........ *G06F 3/04883* (2013.01); *G06F 3/0414* (2013.01)

(58) Field of Classification Search
   None
   See application file for complete search history.

(56) References Cited

U.S. PATENT DOCUMENTS

| 7,698,235 B2 | 4/2010 | Kuroiwa |
| 7,835,999 B2 | 11/2010 | Block |

(Continued)

FOREIGN PATENT DOCUMENTS

| CN | 107734089 A | 2/2018 |
| CN | 110554793 A | 12/2019 |

(Continued)

OTHER PUBLICATIONS

Kim et al., "Artificial Intelligence-Based Optimal Grasping Control," Sensors 20, No. 21 (2020), p. 6390. (Year: 2020).*

(Continued)

*Primary Examiner* — Irete F Ehichioya
(74) *Attorney, Agent, or Firm* — Sughrue Mion, PLLC

(57) ABSTRACT

Provided is an electronic device configured to perform an operation corresponding to a user input by using an artificial intelligence model, and a method performed by the electronic device, of performing the operation. The method comprises obtaining touch data related to a touch input of a user, identifying a first training data set similar to the touch data from a plurality of pre-stored training data sets, training an artificial intelligence model based on the first training data set, identifying a type of a user input that is input to the electronic device, based on the trained artificial intelligence model, and performing an operation corresponding to the identified type of the user input.

15 Claims, 16 Drawing Sheets

(56) References Cited

U.S. PATENT DOCUMENTS

| | | | |
|---|---|---|---|
| 8,432,368 | B2 | 4/2013 | Momeyer et al. |
| 8,473,448 | B2 | 6/2013 | Yuta |
| 8,723,824 | B2 | 5/2014 | Myers et al. |
| 8,948,500 | B2 | 2/2015 | Chen et al. |
| 9,104,308 | B2 | 8/2015 | Au et al. |
| 9,323,360 | B2 | 4/2016 | Lee |
| 9,454,301 | B2 | 9/2016 | Ka et al. |
| 9,507,407 | B2 | 11/2016 | Ng et al. |
| 9,823,781 | B2 | 11/2017 | Ludwig et al. |
| 10,013,094 | B1 | 7/2018 | Smith |
| 10,073,559 | B2 | 9/2018 | Kim et al. |
| 10,241,621 | B2 | 3/2019 | Kang |
| 10,261,685 | B2 | 4/2019 | Deselaers et al. |
| 10,296,210 | B2 | 5/2019 | Jin et al. |
| 10,379,657 | B2 | 8/2019 | Filiz et al. |
| 10,459,561 | B2 | 10/2019 | Bosch Ruiz et al. |
| 10,545,662 | B2 | 1/2020 | Kim |
| 10,558,792 | B2 | 2/2020 | Jiang et al. |
| 10,777,193 | B2 | 9/2020 | Lee et al. |
| 10,782,821 | B2 | 9/2020 | Bjerre |
| 10,795,481 | B2 | 10/2020 | Tsai et al. |
| 10,949,022 | B2 | 3/2021 | Lee |
| 11,099,679 | B2 | 8/2021 | Ledet et al. |
| 11,449,733 | B2 | 9/2022 | Kim et al. |
| 11,531,864 | B2 | 12/2022 | Han et al. |
| 11,977,699 | B2 | 5/2024 | Hwang et al. |
| 12,045,458 | B2 | 7/2024 | Kim et al. |
| 2008/0106520 | A1 | 5/2008 | Free et al. |
| 2009/0251432 | A1 | 10/2009 | Wang et al. |
| 2011/0007023 | A1 | 1/2011 | Abrahamsson et al. |
| 2011/0199323 | A1 | 8/2011 | Lin et al. |
| 2012/0019456 | A1 | 1/2012 | Choi et al. |
| 2012/0056846 | A1 | 3/2012 | Zaliva |
| 2015/0161231 | A1 | 6/2015 | Yu et al. |
| 2015/0241950 | A1 | 8/2015 | Ng et al. |
| 2016/0012348 | A1 | 1/2016 | Johnson et al. |
| 2016/0204001 | A1 | 7/2016 | Lee et al. |
| 2017/0010732 | A1 | 1/2017 | Bosch Ruiz et al. |
| 2017/0200274 | A1 | 7/2017 | Tan et al. |
| 2017/0293396 | A1 | 10/2017 | Jung et al. |
| 2018/0095588 | A1* | 4/2018 | Klein ............... H04L 9/3231 |
| 2018/0107332 | A1 | 4/2018 | Chan et al. |
| 2018/0188938 | A1 | 7/2018 | Deselaers et al. |
| 2018/0276630 | A1 | 9/2018 | Kim et al. |
| 2019/0201929 | A1 | 7/2019 | Yoon et al. |
| 2019/0204929 | A1 | 7/2019 | Attari et al. |
| 2019/0294954 | A1 | 9/2019 | Han et al. |
| 2019/0318261 | A1 | 10/2019 | Deng et al. |
| 2019/0354238 | A1 | 11/2019 | Akhbari et al. |
| 2020/0012382 | A1 | 1/2020 | Lee |
| 2020/0057525 | A1 | 2/2020 | Prest et al. |
| 2020/0097845 | A1 | 3/2020 | Shaikh et al. |
| 2020/0110774 | A1 | 4/2020 | Lakshmanan et al. |
| 2020/0167693 | A1 | 5/2020 | Jiang et al. |
| 2020/0202171 | A1 | 6/2020 | Hughes et al. |
| 2020/0218793 | A1* | 7/2020 | Storm ............... G06V 40/18 |
| 2020/0302339 | A1 | 9/2020 | Nadamuni Raghavan et al. |
| 2020/0310621 | A1 | 10/2020 | Piot et al. |
| 2020/0349246 | A1 | 11/2020 | Budman et al. |
| 2020/0394451 | A1 | 12/2020 | Baijal et al. |
| 2021/0327421 | A1 | 10/2021 | Beaufays et al. |
| 2021/0397342 | A1 | 12/2021 | Luo et al. |
| 2022/0375201 | A1 | 11/2022 | Wiles |
| 2023/0113131 | A1 | 4/2023 | O'Banion et al. |

FOREIGN PATENT DOCUMENTS

| | | |
|---|---|---|
| CN | 111061394 A | 4/2020 |
| EP | 4174629 A1 | 5/2023 |
| EP | 4261663 A1 | 10/2023 |
| JP | 5083320 B2 | 11/2012 |
| JP | 2015-069225 A | 4/2015 |
| KR | 10-1189078 B1 | 10/2012 |
| KR | 10-1202414 B1 | 11/2012 |
| KR | 10-1350782 B1 | 1/2014 |
| KR | 10-1577277 B1 | 12/2015 |
| KR | 10-2016-0000388 A | 1/2016 |
| KR | 10-1653167 B1 | 9/2016 |
| KR | 10-2017-0001108 A | 1/2017 |
| KR | 10-2017-0030246 A | 3/2017 |
| KR | 10-2017-0111773 A | 10/2017 |
| KR | 10-2018-0017500 A | 2/2018 |
| KR | 10-2018-0106744 A | 10/2018 |
| KR | 10-2019-001434 A | 1/2019 |
| KR | 10-2019-0028235 A | 3/2019 |
| KR | 10-2019-0104101 A | 9/2019 |
| KR | 10-2019-0105767 A | 9/2019 |
| KR | 10-2019-0109805 A | 9/2019 |
| KR | 10-2019-0116035 A | 10/2019 |
| KR | 10-2020-0014510 A | 2/2020 |
| KR | 10-2020-0142374 A | 12/2020 |
| KR | 10-2022-0023639 A | 3/2022 |
| KR | 10-2022-0105941 A | 7/2022 |
| WO | 2016/007450 A1 | 1/2016 |
| WO | 2017/007573 A1 | 1/2017 |
| WO | 2017/114062 A1 | 7/2017 |
| WO | 2018/125347 A1 | 7/2018 |
| WO | 2019/159012 A1 | 8/2019 |

OTHER PUBLICATIONS

Zhang et al., "BeyondTouch: Extending the Input Language with Built-in Sensors on Commodity Smartphones," IUI'15, Mar. 29-Apr. 1, 2015, Atlanta, GA, USA, Copyright 2015, 11 pages. (Year: 2015).*

Notice of Allowance issued Mar. 11, 2024 by the United States Patent and Trademark Office in U.S. Appl. No. 18/112,255.

Communication issued May 7, 2024 by the European Patent Office in European Patent Application No. 21919860.3.

Communication dated Nov. 16, 2023, issued by European Patent Office in European Patent Application No. 21858454.8.

Office Action dated Nov. 29, 2023, issued by United States Patent and Trademark Office in U.S. Appl. No. 18/112,255.

European Extended Search Report issued Jun. 12, 2024 by the European Patent Office for EP Patent Application No. 21921451.7.

International Search Report & Written Opinion (PCT/ISA/210 & 237) issued May 4, 2022 by the International Searching Authority in International Application No. PCT/KR2022/001706.

International Search Report & Written Opinion (PCT/ISA/210 & 237) issued Sep. 24, 2021 by the International Searching Authority in International Application No. PCT/KR2021/007825.

International Search Report & Written Opinion (PCT/ISA/210 & 237) issued Feb. 23, 2022 by the International Searching Authority in International Application No. PCT/KR2021/017280.

International Search Report & Written Opinion (PCT/ISA/210 & 237) issued Feb. 21, 2022 by the International Searching Authority in International Application No. PCT/KR2021/016889.

Communication issued Jun. 2, 2023 by the European Patent Office in European Application No. 22704489.8.

Quinn, P., et al., Sensing Force-Based Gestures on the Pixel 4, Google AI Blog, Google Research, Jun. 24, 2020, 6 pages. https://ai.googleblog.com/2020/06/sensing-force-based-gestures-on-pixel-4.html.

Liu, Y., et al., "Ensemble Learning-Based Technique for Force Classifications in Piezoelectric Touch Panels", IEEE Sensors Journal, vol. 20, No. 16, (Aug. 15, 2020), 12 pages, DOI: 10.1109/JSEN.2020.2987768.

Howard, A., et al., "Searching for MobileNetV3", arXiv:1905.02244v5 [cs.CV], Nov. 20, 2019, 11 pages.

Ioffe, S., et al., "Batch Normalization: Accelerating Deep Network Training by Reducing Internal Covariate Shift" arXiv:1502.03167v3 [cs.LG], Mar. 2, 2015, 11 pages.

Rumelhart, D., E., et al., "Learning representations by back-propagating errors", Letters to Nature, vol. 323, Oct. 9, 1986, pp. 533-536.

Edgy Design, Revolutionary Photography, P Series, Huawei Phones—Huawei Global, Jul. 11, 2023, httpsconsumer.huawei.comenphonesmate30-pro.

(56) References Cited

OTHER PUBLICATIONS

Boceck, T., et al., "Force Touch Detection on Capacitive Sensors using Deep Neural Networks", MobileHCI '19: Proceedings of the 21st International Conference on Human-Computer Interaction with Mobile Devices and Services, Oct. 1, 2019, http://dx.doi.org/10.1145/3338286.3344389, 6 pages.

Woo, S., et al. "CBAM: Convolutional Block Attention Module" Convolutional Block Attention Module, 17 pages. arXiv:1807.06521v2 [cs.CV], Jul. 2018.

Office Action dated Mar. 4, 2025, issued by United States Patent and Trademark Office in U.S. Appl. No. 18/746,420.

Office Action dated Apr. 1, 2025, issued by Korean Intellectual Property Office in Korean Patent Application No. 10-2020-0105617.

Office Action issued on Jun. 6, 2025 by the United States Patent Office in U.S. Appl. No. 18/746,420.

Office Action issued Aug. 8, 2025 by the Korean Intellectual Property Office in Korean Patent Application No. 10-2021-0008918.

Office Action issued Jul. 21, 2025 by the Korean Intellectual Property Office in Korean Patent Application No. 10-2021-0004241.

Office Action issued Sep. 3, 2025 by the Korean Intellectual Property Office in Korean Patent Application No. 10-2020-0105617.

Office Action issued on Aug. 27, 2025 by the United States Patent Office in U.S. Appl. No. 18/746,420.

Office Action issued on Oct. 21, 2025 by the European Patent Office in European Patent Application No. 22704489.8.

Office Action issued on Oct. 1, 2025 by the United States Patent Office in U.S. Appl. No. 18/224,868.

Office Action issued Sep. 12, 2025 by the Korean Patent Office in Korean Patent Application No. 10-2021-0077426.

\* cited by examiner

PERSONALIZED ELECTRONIC DEVICE INFERRING USER INPUT, AND METHOD FOR CONTROLLING SAME

CROSS-REFERENCE TO RELATED APPLICATION(S)

This application is a bypass continuation of PCT International Application No. PCT/KR2021/016889, which was filed on Nov. 17, 2021, and claims priority to Korean Patent Application No. 10-2021-0004241, filed on Jan. 12, 2021, in the Korean Intellectual Property Office, the disclosures of which are incorporated herein by reference in their entireties.

BACKGROUND

1. Field

The disclosure relates to an electronic device for inferring a user input, and a method of controlling the electronic device.

2. Description of Related Art

In order to implement a simple design of an electronic device and provide a convenient user interface, technologies related to touch input, such as a touch screen or touch pad, have been applied to devices. The electronic device may provide a satisfactory experience to a user by accurately identifying the users touch input. Recently, methods for accurately identifying a users touch input by using an artificial intelligence system are being considered for a more satisfactory user experience.

An artificial intelligence (AI) system is a computer system that implements human-level intelligence, and allows a machine to learn by itself, make decisions, and become smarter, unlike a rule-based smart systems. As the AI system is more frequently used, the recognition rate of the AI system is improved and accurately understands a user's preference, and accordingly, the rule-based smart systems have gradually been replaced with deep-learning-based AI systems.

The AI technology includes machine learning (deep learning) and element technologies utilizing machine learning.

The machine learning is an algorithm technology that classifies/learns features of input data by itself, and the element technologies are technologies that utilize machine learning algorithms such as deep learning, and cover technical fields such as linguistic understanding, visual understanding, inference/prediction, knowledge representation, operation control, and the like.

The AI technology is employed in various fields as described below. Linguistic understanding is a technique for recognizing, and applying/processing human languages/character systems, and includes natural language processing, machine translation, a dialogue system, question answering, speech recognition/synthesis, etc. Visual understanding is a technique for recognizing and processing an object in the same manner as a human visual system, and includes object recognition, object tracking, image search, human detection, scene understanding, space understanding, image enhancement, etc. Inference/prediction is a technique for determining information for logical inference and prediction, and includes knowledge/probability-based reasoning, optimization prediction, preference-based planning, recommendation, etc. Knowledge representation is a technique for automatically processing human experience information into knowledge data, and includes knowledge establishment (data creation/classification), knowledge management (data utilization), etc. Operation control is a technique for controlling autonomous driving of a vehicle and motion of a robot, and includes motion control (e.g., navigation, collision, driving), manipulation control (e.g., action control), etc.

SUMMARY

Provided are an electronic device that may accurately infer a user input by using artificial intelligence technology, and perform an operation corresponding to the user input, and a method of controlling the electronic device.

Additional aspects will be set forth in part in the description which follows and, in part, will be apparent from the description, or may be learned by practice of the presented embodiments.

According to an aspect of the disclosure, a method, performed by an electronic device, includes: obtaining touch data related to a touch input of a user; identifying a first training data set similar to the touch data from a plurality of pre-stored training data sets; training an artificial intelligence model based on the first training data set; identifying a type of a user input that is input to the electronic device, based on the trained artificial intelligence model; and performing an operation corresponding to the identified type of the user input.

The identifying the first training data set may include: identifying the first training data set based on a result of comparing the touch data with each of the plurality of pre-stored training data sets.

The identifying the first training data set may include: obtaining a first feature vector from the touch data by applying the touch data to the artificial intelligence model; and identifying the first training data set based on a result of comparing the first feature vector with a second feature vector of each of the plurality of pre-stored training data sets.

The identifying the first training data set may include: transmitting, to a server, at least one of the touch data and a first feature vector obtained from the touch data; and receiving, from the server, information about the first training data set based on the at least one of the touch data and the first feature vector, where the training the artificial intelligence model may include training the artificial intelligence model based on the information about the first training data set.

The receiving the information about the first training data set from the server may include: receiving, from the server, the first training data, where training the artificial intelligence model may include training the artificial intelligence model based on the first training data set.

The identifying the first training data set may include transmitting, to a server, at least one of the touch data and a first feature vector obtained from the touch data, and the training the artificial intelligence model may include receiving, from the server, the artificial intelligence model trained based on the first training data set.

The identifying the first training data set may include: obtaining a third feature vector from air pressure data by applying the air pressure data to the artificial intelligence model, the air pressure data being related to a change in air pressure inside the electronic device caused by the touch input of the user; and identifying the first training data set based on a result of comparing the third feature vector with a plurality of fourth feature vectors obtained from air pressure data included in the plurality of pre-stored training data sets, respectively.

According to an aspect of the disclosure, an electronic device includes: a memory storing at least one instruction; a user input module configured to obtain touch data by receiving a touch input of a user; and at least one processor configured to execute the at least one instruction to: obtain touch data related to a touch input of a user, identify a first training data set similar to the touch data from a plurality of pre-stored training data sets, train an artificial intelligence model based on the first training data set, identify a type of a user input that is input to the electronic device, based on the trained artificial intelligence model, and control the electronic device to perform an operation corresponding to the identified type of the user input.

The at least one processor may be further configured to execute the at least one instruction to identify the first training data set based on a result of comparing the touch data with each of the plurality of pre-stored training data sets.

The at least one processor may be further configured to execute the at least one instruction to obtain a first feature vector from the touch data by applying the touch data to the artificial intelligence model, and identify the first training data set based on a result of comparing the first feature vector with a second feature vector of each of the plurality of pre-stored training data sets.

The electronic device may include a communication unit configured to transmit and receive data to and from a server, and the at least one processor may be further configured to execute the at least one instruction to transmit, to the server, at least one of the touch data and a first feature vector obtained from the touch data, receive, from the server, information about the first training data set that is identified based on the at least one of the touch data and the first feature vector, and train the artificial intelligence model based on the information about the first training data set.

The at least one processor may be further configured to execute the at least one instruction to control the communication unit to receive the first training data set from the server, and train the artificial intelligence model based on the first training data set.

The electronic device may include a communication unit configured to transmit and receive data to and from a server, and the at least one processor may be further configured to execute the at least one instruction to The at least one processor may be further configured to execute the at least one instruction to The at least one processor may be further configured to execute the at least one instruction to control the communication unit to: transmit, to the server, at least one of the touch data and a first feature vector obtained from the touch data, and receive, from the server, an artificial intelligence model trained based on the first training data set.

The electronic device may include an air pressure sensor configured to obtain air pressure data related to a change in air pressure inside the electronic device caused by the touch input of the user, and the at least one processor may be further configured to execute the at least one instruction to obtain a third feature vector from the air pressure data by applying the air pressure data to the artificial intelligence model, and identify the first training data set based on a result of comparing the third feature vector with a plurality of fourth feature vectors obtained from air pressure data included in the plurality of pre-stored training data sets, respectively.

According to an aspect of the disclosure, a non-transitory computer readable medium stores computer readable program code or instructions which are executable by a processor to perform a method for allowing an electronic device to perform an operation corresponding to a user input based on an artificial intelligence model, the method comprising: obtaining touch data related to a touch input of a user; identifying a first training data set similar to the touch data from a plurality of pre-stored training data sets; training an artificial intelligence model based on the first training data set; identifying a type of a user input that is input to the electronic device, based on the trained artificial intelligence model; and performing an operation corresponding to the identified type of the user input.

The identifying the first training data set may include: identifying the first training data set based on a result of comparing the touch data with each of the plurality of pre-stored training data sets.

The identifying the first training data set may include: obtaining a first feature vector from the touch data by applying the touch data to the artificial intelligence model; and identifying the first training data set based on a result of comparing the first feature vector with a second feature vector of each of the plurality of pre-stored training data sets.

The identifying the first training data set may include: transmitting, to a server, at least one of the touch data and a first feature vector obtained from the touch data; and receiving, from the server, information about the first training data set based on the at least one of the touch data and the first feature vector, where the training the artificial intelligence model may include training the artificial intelligence model based on the information about the first training data set.

The receiving the information about the first training data set from the server may include: receiving, from the server, the first training data, where training the artificial intelligence model may include training the artificial intelligence model based on the first training data set.

The identifying the first training data set may include transmitting, to a server, at least one of the touch data and a first feature vector obtained from the touch data, and the training the artificial intelligence model may include receiving, from the server, the artificial intelligence model trained based on the first training data set.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
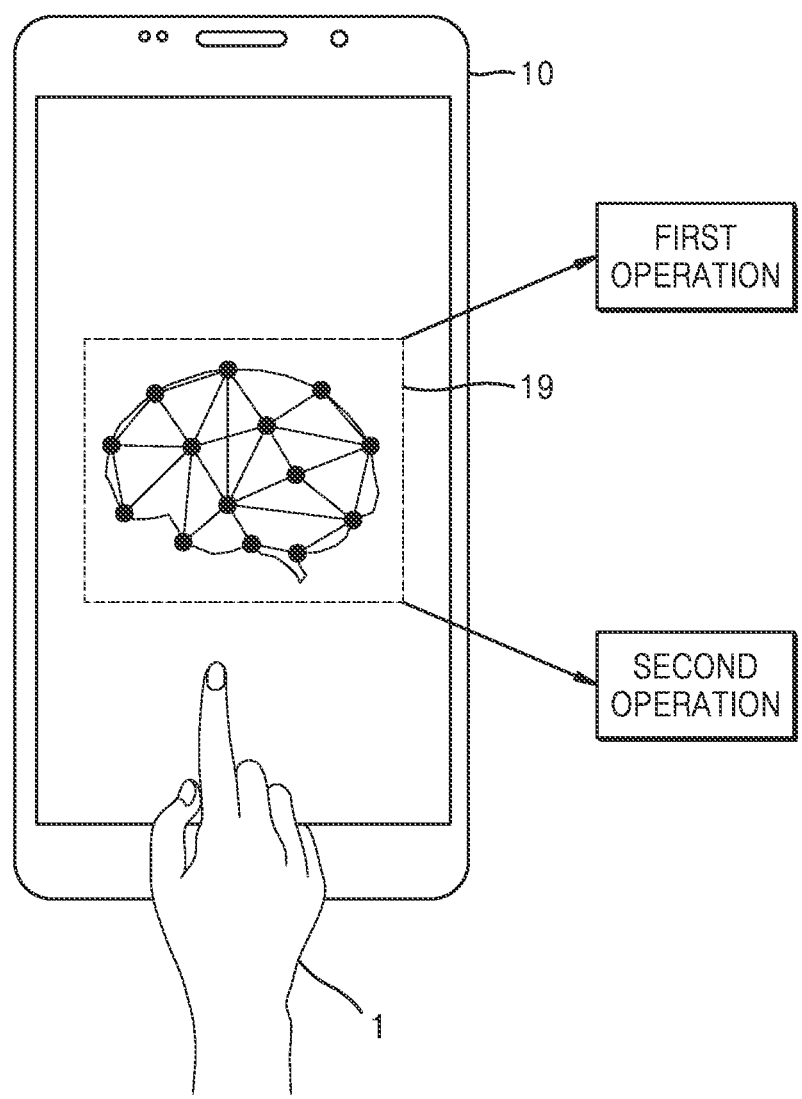
FIG. 1 is a diagram illustrating an example in which an electronic device performs an operation corresponding to a received user input, according to an embodiment.

The embodiments herein and the various features and advantageous details thereof are explained more fully with reference to the non-limiting embodiments that are illustrated in the accompanying drawings and detailed in the following description, where similar reference characters denote corresponding features consistently throughout. Descriptions of well-known components and processing techniques are omitted so as to not unnecessarily obscure the embodiments herein. Also, the various embodiments described herein are not necessarily mutually exclusive, as some embodiments may be combined with one or more other embodiments to form new embodiments. The examples used herein are intended merely to facilitate an understanding of ways in which the embodiments herein may be practiced and to further enable those skilled in the art to practice the embodiments herein. Accordingly, the examples should not be construed as limiting the scope of the embodiments herein.

The terms "module" or "part" used in the embodiments herein perform at least one function or operation, and may be implemented with a hardware (e.g., a processor or a circuit) or software (e.g., executable by a hardware component such as a processor), or a combination of hardware and software. In addition, a plurality of "modules" or a plurality of "parts", except for a "module" or a "part" which needs to be implemented to a specific hardware, may be integrated to at least one module and implemented in at least one processor.

Some embodiments of the disclosure may be represented by functional block components and various processing operations. Some or all of the functional blocks may be implemented by any number of hardware and/or software elements that perform particular functions. For example, the functional blocks of the disclosure may be embodied by at least one microprocessor or by circuit components for a certain function. In addition, for example, the functional blocks of the disclosure may be implemented by using various programming or scripting languages. The functional blocks may be implemented by using various algorithms executable by one or more processors. Furthermore, the disclosure may employ known technologies for electronic settings, signal processing, and/or data processing. Terms such as "mechanism", "element", "unit", or "component" are used in a broad sense and are not limited to mechanical or physical components.

Throughout the present specification, when a part is referred to as being "connected to" another part, it may be "directly connected to" the other part or be "electrically connected to" the other part through an intervening element. In addition, when an element is referred to as "including" a component, the element may additionally include other components rather than excluding other components as long as there is no particular opposing recitation.

In addition, connection lines or connection members between components illustrated in the drawings are merely exemplary of functional connections and/or physical or circuit connections. Various alternative or additional functional connections, physical connections, or circuit connections between components may be present in a practical device.

In addition, although terms such as "first" or "second" may be used herein to describe various elements, these elements should not be limited by these terms. These terms may be only used to distinguish one element from another.

In a method of controlling an electronic device according to the disclosure, an artificial intelligence model may be used to infer or predict a user input, for identifying a user input.

Inference/prediction is a technique for determining information for logical inference and prediction, and includes knowledge/probability-based reasoning, optimization prediction, preference-based planning, recommendation, etc.

Functions related to artificial intelligence according to embodiments of the disclosure are performed by a processor and a memory. The processor may include one or more processors. In this case, the one or more processors may be a general-purpose processor, such as a central processing unit (CPU), an application processor (AP), or a digital signal processor (DSP), a dedicated graphics processor, such as a graphics processing unit (GPU) or a vision processing unit (VPU), or a dedicated artificial intelligence processor, such as a neural processing unit (NPU). The one or more processors perform control to process input data according to predefined operation rules or an artificial intelligence model stored in the memory. Alternatively, in a case in which the one or more processors are dedicated artificial intelligence processors, the dedicated artificial intelligence processor may be designed with a hardware structure specialized for processing a particular artificial intelligence model. The processor may perform preprocessing of converting data applied to the artificial intelligence model into a form suitable for application to the artificial intelligence model.

The artificial intelligence model may be generated via a training process. Here, being generated via a training process may mean that predefined operation rules or artificial intelligence model set to perform desired characteristics (or purposes), is generated by training a basic artificial intelligence model by using a learning algorithm that utilizes a large amount of training data. The training process may be performed by a device itself on which artificial intelligence according to the disclosure is performed, or by a separate server and/or system. Examples of learning algorithms may include, for example, and without limitation, supervised learning, unsupervised learning, semi-supervised learning, reinforcement learning, or the like, but are not limited thereto.

The artificial intelligence model may include a plurality of neural network layers. Each of the neural network layers has a plurality of weight values, and performs a neural network arithmetic operation via an arithmetic operation between an arithmetic operation result of a previous layer and the plurality of weight values. A plurality of weight values in each of the neural network layers may be optimized by a result of training the artificial intelligence model. For example, the plurality of weight values may be refined to reduce or minimize a loss or cost value obtained by the artificial intelligence model during the training process. The artificial neural network may include, for example, a deep neural network (DNN) and may include, for example, a convolutional neural network (CNN), a deep neural network (DNN), a recurrent neural network (RNN), a restricted Boltzmann machine (RBM), a deep belief network (DBN), a bidirectional recurrent deep neural network (BRDNN), deep Q-networks (DQN), or the like, but is not limited thereto.

Hereinafter, embodiments will be described in detail with reference to the drawings.

FIG. 1 is a diagram illustrating an example in which an electronic device performs an operation corresponding to a received user input, according to an embodiment.

According to an embodiment, an electronic device 10 may include a mobile device (e.g., a smart phone, a tablet personal computer (PC), etc.) including an artificial intelligence model, and a computing device such as a general-purpose PC. In addition, the electronic device 10 may include a mobile device (e.g., a smart phone, a tablet PC, etc.) capable of transmitting and receiving data to and from a server including an artificial intelligence model through a network, and a computing device such as a general-purpose PC.

A plurality of artificial intelligence models may be used in the example embodiments according to the purpose and use. For example, the plurality of artificial intelligence models used in the example embodiments may include a first artificial intelligence model configured to obtain a feature vector from touch data received from a user for initial setting, a second artificial intelligence model configured to obtain a feature vector from air pressure data related to a change in the air pressure inside the electronic device caused by a touch input of the user, a third artificial intelligence model configured to calculate the similarity between the feature vector of the touch data and a feature vector obtained from each of pieces of touch data included in a plurality of training data sets, a fourth artificial intelligence model configured to calculate the similarity between the feature vector of the air pressure data and a feature vector obtained from each of pieces of air pressure data included in the plurality of training data sets, and a fifth artificial intelligence model configured to identify the type of a user input. In addition, depending on the purpose and use, the first artificial intelligence model and the second artificial intelligence model may be configured as one artificial intelligence model, and the third artificial intelligence model and the fourth artificial intelligence model may be configured as one artificial intelligence model. In addition, the first to fifth artificial intelligence models may be configured as one artificial intelligence model. That is, the artificial intelligence model used in the example embodiments may be implemented in various embodiments according to the manufacturer of the electronic device or the user of the electronic device, and is not limited by the above examples.

The artificial intelligence model used in the example embodiments may exist in the form of at least one processor. For example, at least one of the electronic device 10 and a server 20 may include an artificial intelligence model in the form of a processor configured to obtain a feature vector of at least one of touch data and air pressure data. As another example, the electronic device 10 may include an artificial intelligence model in the form of a processor configured to identify a user input. The processor may include at least one general-purpose processor (e.g., a CPU or an AP) and at least one processor designed to perform a function of identifying a user input. The processor may execute at least one command to identify a user input and generate a control signal for performing an operation corresponding to the identified user input.

Referring to FIG. 1, the electronic device 10 may receive an input from a user 1. For example, the electronic device 10 may receive an input from the user 1 through a touch screen. In this case, the user input may include, but is not limited to, an input of touching a partial region of the touch screen for a short time period (hereinafter, referred to as a normal touch), an input of touching a partial region of the touch screen for a long time period (hereinafter, referred to as a long touch), an input of strongly pressing a partial region of the touch screen (hereinafter, referred to as a force touch), an input of touching a partial region of the touch screen and dragging (hereinafter, referred to as a drag).

Referring to FIG. 1, the electronic device 10 may identify the type of a user input by using an artificial intelligence model 19. For example, the electronic device 10 may identify the type a user input received through the touch screen, as a normal touch, a long touch, a force touch, or a drag, by using the artificial intelligence model 19. Also, the electronic device 10 may identify the type of a user input, as a long-touch-and-drag or a force-touch-and-drag, by using the artificial intelligence model 19. According to an embodiment, the electronic device 10 may identify the type of an input received from the user by using a personalized artificial intelligence model.

Referring to FIG. 1, the electronic device 10 may perform an operation corresponding to the identified type of the user input.

For example, in response to a normal touch, the electronic device 10 may perform an operation of selecting an object corresponding to a region in which the touch is input.

As another example, in response to a long touch, the electronic device 10 may perform an operation of displaying a pop-up screen for performing an additional operation on an object located in a region in which the touch is input.

As another example, in response to a user input identified as a force touch, the electronic device 10 may provide a user interface that provides a shortcut function.

As another example, in response to a user input identified as a drag, the electronic device 10 may provide a user interface that provides a function of moving the location of an object.

As another example, in response to a user input identified as a force-touch-and-drag, the electronic device 10 may provide a user interface for controlling a certain function of the electronic device. In detail, in response to a user input identified as a force-touch-and-vertical-drag, the electronic device 10 may provide a user interface for adjusting the brightness of a display. In response to a user input identified as a force-touch-and-horizontal-drag, the electronic device 10 may provide a user interface for adjusting the intensity of an output sound.

The artificial intelligence model 19 built in the electronic device 10 may be a personalized artificial intelligence model obtained through training based on training data similar to touch data received from the user. The electronic device 10 may train the artificial intelligence model 19 by identifying a training data set similar to the touch data from among a plurality of pre-stored training data sets. Alternatively, the electronic device 10 may train the artificial intelligence model 19 by using the server 20. The artificial intelligence model 19 to be trained may be an artificial intelligence model for initial setting. In addition, the electronic device 10 may update the artificial intelligence model 19 based on a result of the type of a user input identified by using the artificial intelligence model 19.

According to an embodiment of the disclosure, the electronic device may accurately perform an operation thereof intended by the user, by identifying the type of a user input. Also, the electronic device may provide a user interface in place of a physical key, by identifying various types of user input. In addition, the electronic device may identify a force touch even without including a sensor in the art configured to identify a force touch (hereinafter, referred to as a force touch sensor). Because the force touch sensor increases the thickness and weight of the electronic device, the electronic device according to an embodiment of the disclosure may be made thinner and lighter than electronic devices in the art.

Figure 2:
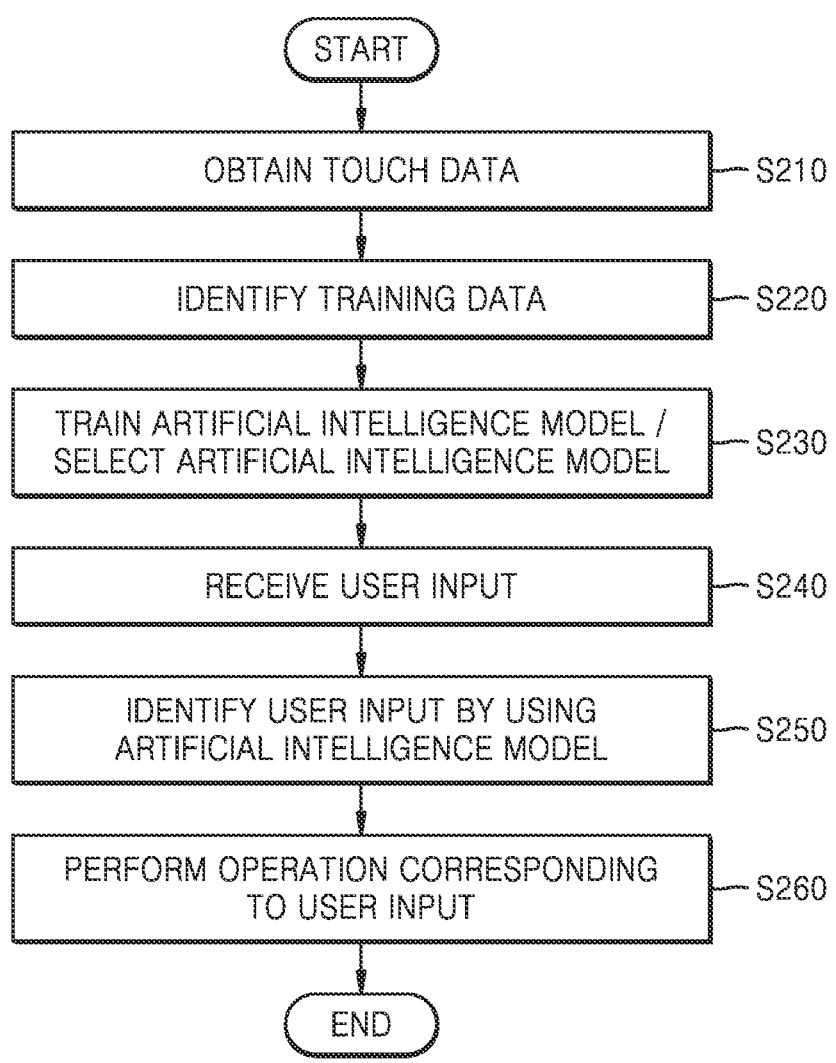
FIG. 2 is a flowchart of a method, performed by an electronic device, of performing an operation corresponding to a user input by using an artificial intelligence model, according to an embodiment.

FIG. 2 is a flowchart of a method, performed by an electronic device, of performing an operation corresponding to a user input by using an artificial intelligence model, according to an embodiment.

Referring to operation S210, the electronic device 10 may receive a touch input from a user.

The electronic device 10 may obtain touch data related to a region in which the touch input of the user is received through the touch screen, at a preset time interval. The touch data refers to data indicating the time interval and region of the touch input of the user being received through the touch screen of the electronic device 10.

Also, while obtaining the touch data, the electronic device 10 may obtain air pressure data related to a change in the air pressure inside the electronic device 10 caused by the touch input of the user.

The electronic device 10 may obtain user touch data by using an interface.

For example, the electronic device 10 may obtain the touch data of the user through an interface for receiving an input of the user regarding personal information of the user (e.g., the age, gender, etc. of the user).

As another example, the electronic device 10 may obtain the user touch data through an interface for receiving a user input for initial setting. The electronic device 10 may obtain touch data for a normal touch, a long touch, a force touch, and a drag, through an interface requesting, from the user, a touch input such as a normal touch, a long touch, a force touch, and a drag.

In detail, the electronic device 10 may display the interface requesting, from the user, a touch input such as a normal touch, a long touch, a force touch, or a drag, on a certain position on the touch screen. The electronic device 10 may display a text or output a voice, for requesting the user to make a normal touch, a long touch, a force touch, or a drag on a circular indicator displayed at a certain position on the touch screen. The electronic device 10 may output, as a text or a voice, a guide for a touch input of the user (e.g., a guide for designating a finger for the touch input, a guide for designating a part of a finger for the touch input). The electronic device 10 may output feedback corresponding to the degree of reception of the touch input from the user (e.g., feedback outputting a voice, feedback outputting a vibration, or feedback changing the color of an indicator). The electronic device 10 may output the indicator in a color corresponding to the type of the received touch input (e.g., blue for a normal touch, yellow for a long touch, and red for a force touch). The electronic device 10 may store the obtained touch data in a memory. The electronic device 10 may store the touch data received from the user together with the type of the touch input requested from the user. Alternatively, the electronic device 10 may transmit the obtained touch data to the server 20. The electronic device 10 may transmit, to the server 20, the touch data received from the user together with the type of the touch input requested from the user.

Referring to operation S220, the electronic device 10 may identify training data similar to the input data of the user. The electronic device 10 may identify a first training data set similar to the touch data, from among a plurality of pre-stored training data sets. The training data set refers to a group of touch data and/or air pressure data classified as being similar to the touch data according to a predefined criterion, in order to obtain a personalized artificial intelligence model for identifying the type of a user input. According to an embodiment, the plurality of pre-stored training data sets may have been classified based on at least one of the age, gender, and finger sizes of the user, and a feature vector. The electronic device 10 may select training data similar to the input data of the user, based on personal information received from the user, such as the age and gender of the user.

According to an embodiment, the electronic device 10 may identify the first training data set by using an artificial intelligence model to compare the touch data with touch data included in each of the plurality of pre-stored training data sets. In this case, the artificial intelligence model may be an artificial intelligence model for initial setting. The artificial intelligence model for initial setting may be a general-purpose artificial intelligence model that has been trained to identify the type of a user input and a training data set similar to input data of a user, based on a plurality of pre-stored training data sets.

For example, the electronic device 10 may identify training data similar to the input data of the user by using the artificial intelligence model to compare a touch region image representing the region in which the user input is received, with a touch region image included in the training data.

As another example, the electronic device 10 may identify the first training data set by comparing the area of the region in which the touch input is received, which is included in the touch data, with the area of a region in which a touch input is received, which is included in each of the plurality of training data sets.

As another example, the electronic device 10 may identify the first training data set, based on a result of comparing a time interval during which the touch input is received, which is included in the touch data, with a time interval during which a touch input is received, which is included in each of the plurality of training data sets.

As another example, the electronic device 10 may identify the first training data set, based on a result of comparing feature data obtained by inputting the touch data to an artificial intelligence model, with feature data of each of the plurality of training data set. In this case, the feature data may include a feature map of the touch data, a feature vector of the touch data, and a probability value that the touch data corresponds to a type.

According to an embodiment, the electronic device 10 may identify the first training data set by using air pressure data together with the touch data. The electronic device 10 may identify the first training data set, based on a result of comparing at least one feature data obtained by applying the touch data and the air pressure data to at least one artificial intelligence model, with feature data of each of the plurality of training data sets. In this case, the feature data may include a feature map of the touch data, a feature vector of the touch data, and a probability value that the touch data corresponds to a type.

For example, the electronic device 10 may identify the first training data set, based on a result of comparing a first feature vector obtained by applying the touch data and the air pressure data to one artificial intelligence model, with a second feature vector of each of the plurality of training data sets.

As another example, the electronic device 10 may identify the first training data set, based on a result of comparing feature vectors obtained by applying the touch data and the air pressure data to separate artificial intelligence models, respectively, with the feature vector of each of the plurality of training data sets.

According to an embodiment, the electronic device 10 may identify the first training data set by using the server 20. The electronic device 10 may request the server 20 to select the first training data set from among a plurality of training data sets stored in the server 20. The server 20 may select the first training data set from among the plurality of training data sets, in response to the request of the electronic device 10. In this case, the method of identifying the first training data set described above may be inferentially applied, and thus, redundant descriptions thereof are omitted. The electronic device 10 may identify the first training data set by receiving information about the first training data set identified by the server 20. The information about the first training data set may include identification information indicating the first training data set from among the plurality of training data sets. Also, the information about the first training data set may include data constituting the first training data set.

For example, the electronic device 10 may transmit, to the server 20, at least one of the touch data and the first feature vector of the touch data. The electronic device 10 may identify the first training data set by receiving, from the server 20, information (e.g., identification information of the first training data set) about the first training data set identified by the server 20 using at least one of the touch data and the first feature vector.

In addition, the electronic device 10 may identify the first training data set by receiving, from the server 20, data constituting the first training data set.

Referring to operation S230, the electronic device 10 may obtain a personalized artificial intelligence model by training at least one artificial intelligence model based on the identified training data set. The electronic device 10 may train the artificial intelligence model by using a training data set read out from the memory of the electronic device 10. Alternatively, the electronic device 10 may train the artificial intelligence model by using a training data set received from the server 20.

According to an embodiment, the electronic device 10 may train, based on the training data set identified in operation S220, an artificial intelligence model that has not been trained based on training data.

According to an embodiment, the electronic device 10 may train an artificial intelligence model for initial setting, based on the training data set identified in operation S220. The artificial intelligence model for initial setting may be a general-purpose artificial intelligence model trained based on at least some of the plurality of training data sets.

According to an embodiment, the electronic device 10 may obtain one personalized artificial intelligence model by training one artificial intelligence model, based on a training data set including training data for touch data and air pressure data.

According to an embodiment, the electronic device 10 may obtain two or more personalized artificial intelligence models by training separate artificial intelligence models based on training data for touch data and training data for air pressure data, respectively. In detail, the electronic device 10 may obtain a first personalized artificial intelligence model and a second personalized artificial intelligence model by training a first artificial intelligence model based on first training data for touch data included in the first training data set, and training a second artificial intelligence model based on second training data for air pressure data included in the first training data set.

According to an embodiment, the electronic device 10 may obtain a personalized artificial intelligence model by receiving an artificial intelligence model trained by the server 20, and replacing the artificial intelligence model built in the electronic device 10 with the received artificial intelligence model. Alternatively, the electronic device 10 may obtain a personalized artificial intelligence model by receiving parameters of an artificial intelligence model trained by the server 20, and updating the artificial intelligence model built in the electronic device 10 by using the received parameters. A method, performed by the server 20 of training the artificial intelligence model may be inferred from the above-described method, performed by the electronic device 10, of training the artificial intelligence model, and thus, redundant descriptions thereof are omitted.

According to an embodiment, the electronic device 10 may identify the first artificial intelligence model corresponding to the first training data set, from among the plurality of artificial intelligence models corresponding to the plurality of training data sets, respectively. The plurality of artificial intelligence models may be pre-trained based on training data sets corresponding to the plurality of artificial intelligence models, respectively. The plurality of artificial intelligence models may be stored in the memory of the electronic device 10, or may stored in a database (DB) of the server 20. The electronic device 10 may obtain a personalized artificial intelligence model by replacing the artificial intelligence model built in the electronic device 10 with the first artificial intelligence model. For example, the electronic device 10 may replace the artificial intelligence model built in the electronic device 10 by reading out the first artificial intelligence model from the memory. As another example, the electronic device 10 may replace the artificial intelligence model built in the electronic device 10 with the first artificial intelligence model received from the server 20.

Referring to operation S240, the electronic device 10 may receive a user input.

The electronic device 10 may receive, through the touch screen, the user input such as a normal touch, long touch, force touch, or a drag, for performing a certain operation.

According to an embodiment, the electronic device 10 may obtain touch data related to a region in which the touch input of the user is received through the touch screen, at a preset time interval.

According to an embodiment, while obtaining the touch data, the electronic device 10 may obtain air pressure data related to a change in the air pressure inside the electronic device 10 caused by the touch input of the user.

Referring to operation S250, the electronic device 10 may identify the received user input by using the trained artificial intelligence model.

The electronic device 10 may identify the type of the user input by applying the user input received in operation S240 to the artificial intelligence model trained in operation S230. For example, the electronic device 10 may identify the type the user input received through the touch screen, as a normal touch, a long touch, a force touch, or a drag, by using the artificial intelligence model 19.

According to an embodiment, the electronic device 10 may identify the type of the user input by applying touch data and air pressure data obtained from the user input, to the artificial intelligence model. For example, the electronic device 10 may apply at least one of the touch data and the air pressure data to the artificial intelligence model to obtain a probability value that the user input corresponds to a certain type, and identify the type of the user input, based on the obtained probability value. In detail, the electronic device 10 may obtain probability values that the user input corresponds a normal touch, a long touch, a force touch, and a drag, respectively, by using the artificial intelligence model, and identify the type of the user input corresponding to the highest probability value among the obtained probability values.

According to an embodiment, the electronic device 10 may identify the type of the user input by using probability values obtained by applying the touch data and the air pressure data obtained from the user input, to one artificial intelligence model.

According to an embodiment, the electronic device 10 may identify the type of the user input by applying weight values to probability values obtained by applying the touch data and the air pressure data to separate artificial intelligence models, respectively. For example, the electronic device 10 may apply weight values to a first probability value obtained by applying the touch data to a first artificial intelligence model, and a second probability value obtained by applying the air pressure data to a second artificial intelligence model, respectively. The electronic device 10 may identify the type of the user input corresponding to the higher value among the first probability value and the second probability value to which the weight values are applied.

Referring to operation S260, the electronic device 10 may perform an operation corresponding to the type of the user input identified in operation S250. The electronic device 10 may provide a user interface in which the operation corresponding to the type of the user input is executed, based on a region in which the touch input of the user is received in operation S240, and the type of the user input identified in operation 250.

For example, in response to the user input being identified as a normal touch, the electronic device 10 may perform an operation of selecting an object corresponding to the region in which the touch is input through the touch screen.

As another example, in response to the user input being identified as a long touch, the electronic device 10 may perform an operation of displaying a pop-up screen for performing an additional operation on an object located in the region in which the touch is input. As another example, in response to the user input being identified as a force touch, the electronic device 10 may perform an operation of providing a shortcut function. In detail, in a case in which a user input that is input for an application icon displayed on the electronic device 10 is identified as a force touch, the electronic device 10 may perform an operation of providing a page displaying detailed information such as the amount of memory occupied by the application.

As another example, in response to the user input being identified as a force touch, the electronic device 10 may provide a user interface for changing content being displayed on the touch screen of the electronic device 10. In detail, in response to identifying that a force touch has been input at the bottom of the touch screen in which an Internet browser application is displayed, the electronic device 10 may provide a user interface such that content being displayed on the touch screen is moved upward. Alternatively, in response to identifying that a force touch has been input to the right side of the touch screen on which photos included in a first folder are displayed through a gallery application, the electronic device 10 may provide a user interface such that photos included in a second folder are displayed.

As another example, in response to the user input being identified as a force-touch-and-drag, the electronic device 10 may perform an operation of controlling a hardware function of the electronic device 10.

Figure 3:
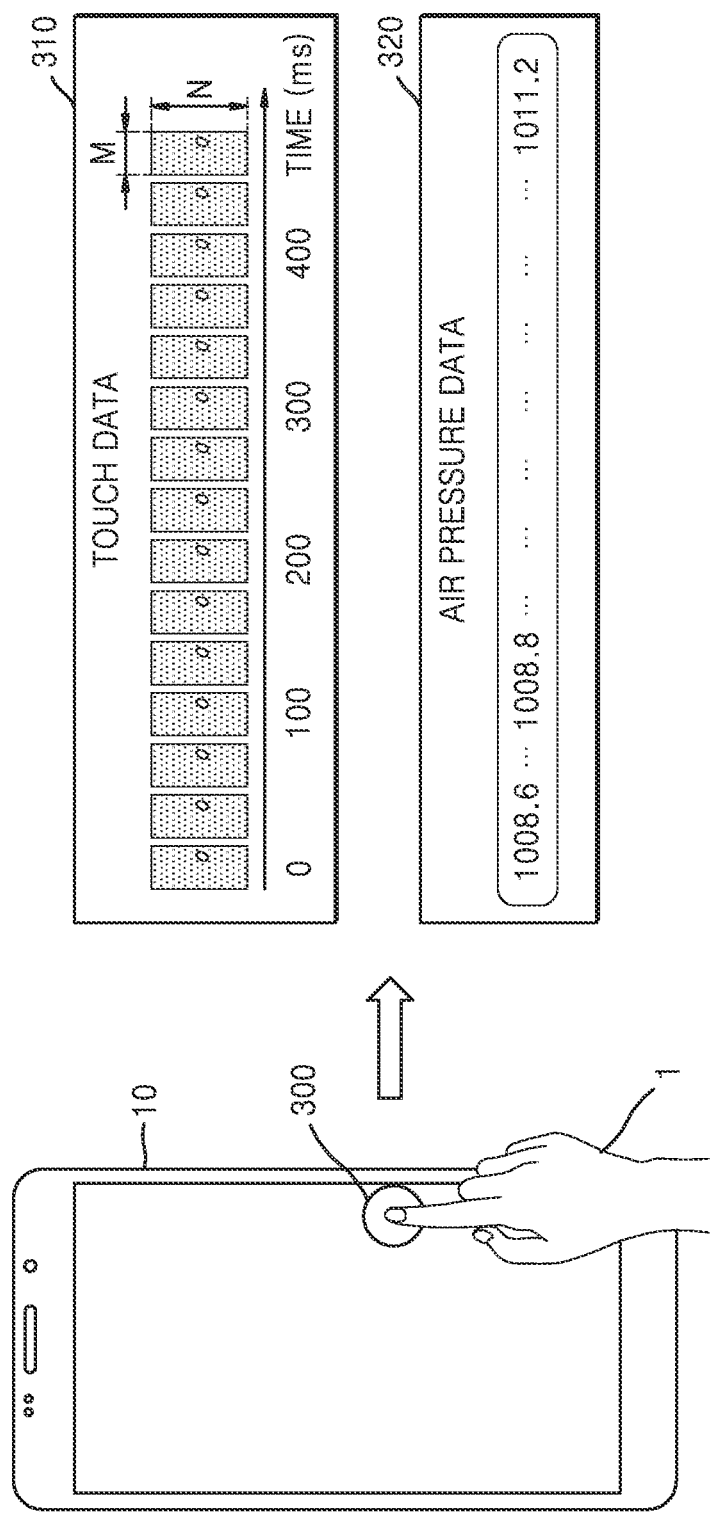
FIG. 3 is a diagram for describing a method, performed by an electronic device, of obtaining at least one of touch data and air pressure data from a user input, according to an embodiment.

FIG. 3 is a diagram for describing a method, performed by an electronic device, of obtaining at least one of touch data and air pressure data from a user input, according to an embodiment.

Referring to FIG. 3, the electronic device 10 may receive a touch input from the user 1 through the touch screen. The electronic device 10 may obtain at least one of touch data 310 and air pressure data 320 while receiving the touch input from the user 1.

According to an embodiment, the electronic device 10 may obtain the touch data 310 related to a region 300 in which the touch input of the user is received through the touch screen, at a preset time interval. For example, the electronic device 10 may obtain the touch data 310 of X frames, by segmenting the touch screen into M×N regions and scanning each of the regions at a certain time interval T ms (1/T Hz). The electronic device 10 may obtain the touch data 310 from each of the regions by measuring a microcurrent flowing through the finger of the user or an electric field value of an electrode corresponding to the region in which the input of the user is received, and normalizing the measured microcurrent or electric field value into a real number between 0 and 1.

According to an embodiment, the electronic device 10 may group a certain number of pieces of touch data 310 into one set. For example, the electronic device 10 may group, into one set, the touch data 310 of X frames segmented into M×N regions, which is obtained every T ms.

According to an embodiment, while obtaining the touch data 310, the electronic device 10 may obtain the air pressure data 320 related to a change in the air pressure inside the electronic device 10 caused by the touch input of the user. The inside of the electronic device 10 may be sealed to support a waterproof function. Accordingly, the electronic device 10 may obtain the air pressure data 320 by measuring the air pressure inside the electronic device 10, which is changed by the touch input of the user pressing the electronic device 10, at a preset time interval by using an air pressure sensor. The electronic device 10 may obtain the air pressure data 320 whenever the touch data 310 is obtained. The electronic device 10 may group, into one set, pieces of air pressure data 320 respectively corresponding to pieces of touch data 310 grouped into one set. For example, the electronic device 10 may group, into one set, the pieces of air pressure data 320 respectively corresponding the pieces of touch data 310 of the X frames obtained every T ms.

The electronic device 10 may store the obtained touch data and air pressure data, in the memory of the electronic device 10. Also, the electronic device 10 may transmit the touch data and the air pressure data to the server 20.

Figure 4:
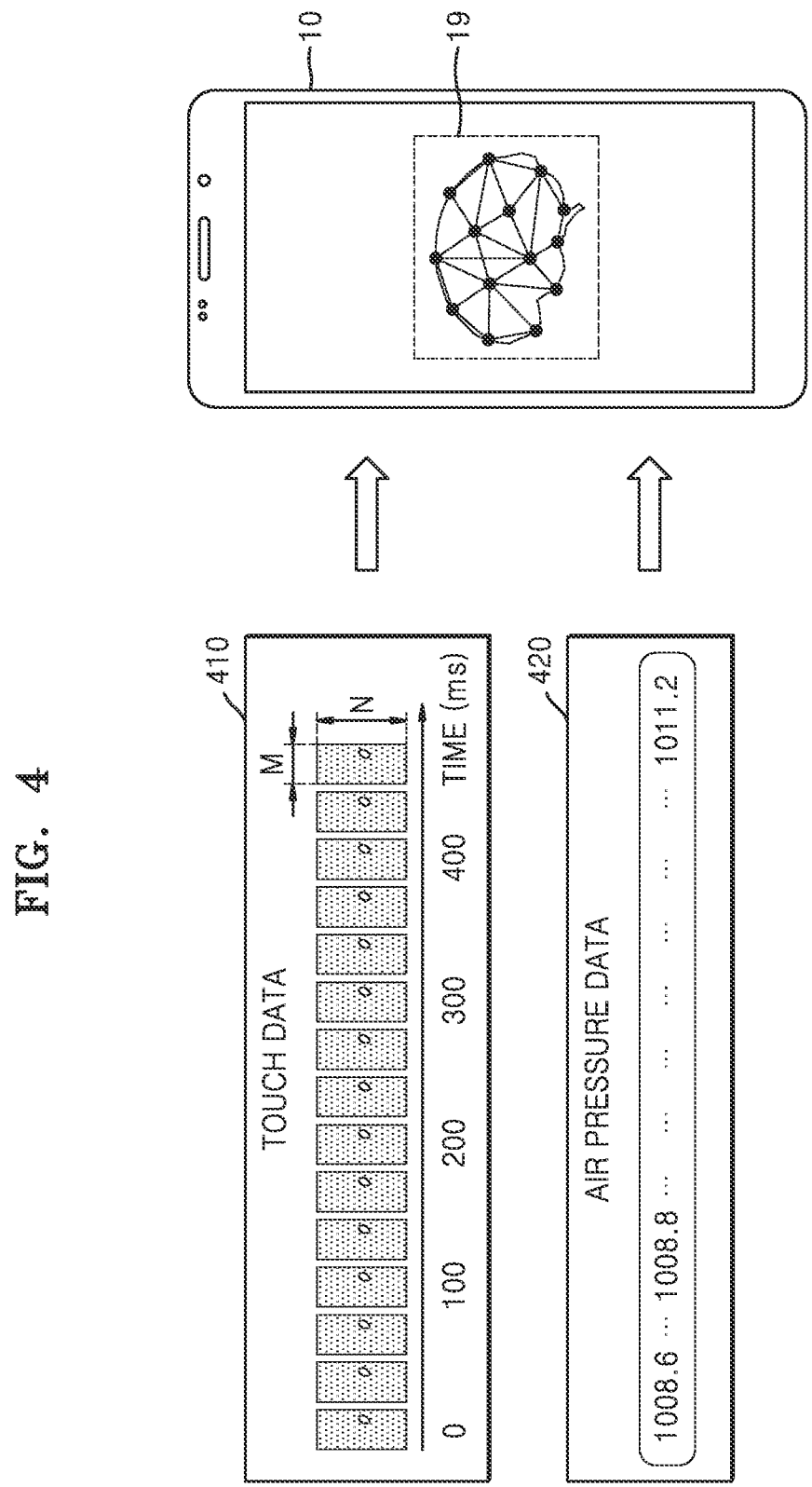
FIG. 4 is a diagram for describing a method, performed by an electronic device, of applying at least one of touch data and air pressure data to an artificial intelligence model, according to an embodiment.

FIG. 4 is a diagram for describing a method, performed by an electronic device, of applying at least one of touch data and air pressure data to an artificial intelligence model, according to an embodiment.

Referring to FIG. 4, the electronic device 10 may apply, to the artificial intelligence model 19, at least one of touch data 410 and air pressure data 420 obtained from a touch screen having received a user input.

According to an embodiment, the artificial intelligence model 19 may include an artificial intelligence model for initial setting that is trained to identify a training data set similar to the user input, based on the at least one of the touch data 410 and the air pressure data 420.

According to an embodiment, the artificial intelligence model 19 may be a general-purpose artificial intelligence model trained, at least some of a plurality of training data sets, to identify the type of a user input.

According to an embodiment, the artificial intelligence model 19 may include an artificial intelligence model trained to obtain, through a convolutional layer, feature data from input data.

The electronic device 10 may perform preprocessing of converting the input touch data 410 and air pressure data 420 into data in a format applicable to the convolutional layer. The electronic device 10 may store the preprocessed touch data and air pressure data, in the memory of the electronic device 10. The electronic device 10 may transmit the preprocessed touch data and air pressure data to the server 20. The electronic device 10 may input the preprocessed touch data and air pressure data to the artificial intelligence model 19.

According to an embodiment, the electronic device 10 may apply the touch data 410 and the air pressure data 420 to one artificial intelligence model. For example, the electronic device 10 may apply the touch data 410 and air pressure data 420 to a first artificial intelligence model.

According to an embodiment, the electronic device 10 may apply the touch data 410 and the air pressure data 420 to separate artificial intelligence models, respectively. For example, the electronic device 10 may apply the touch data 410 to a first artificial intelligence model, and apply the air pressure data 420 to a second artificial intelligence model.

Figure 5:
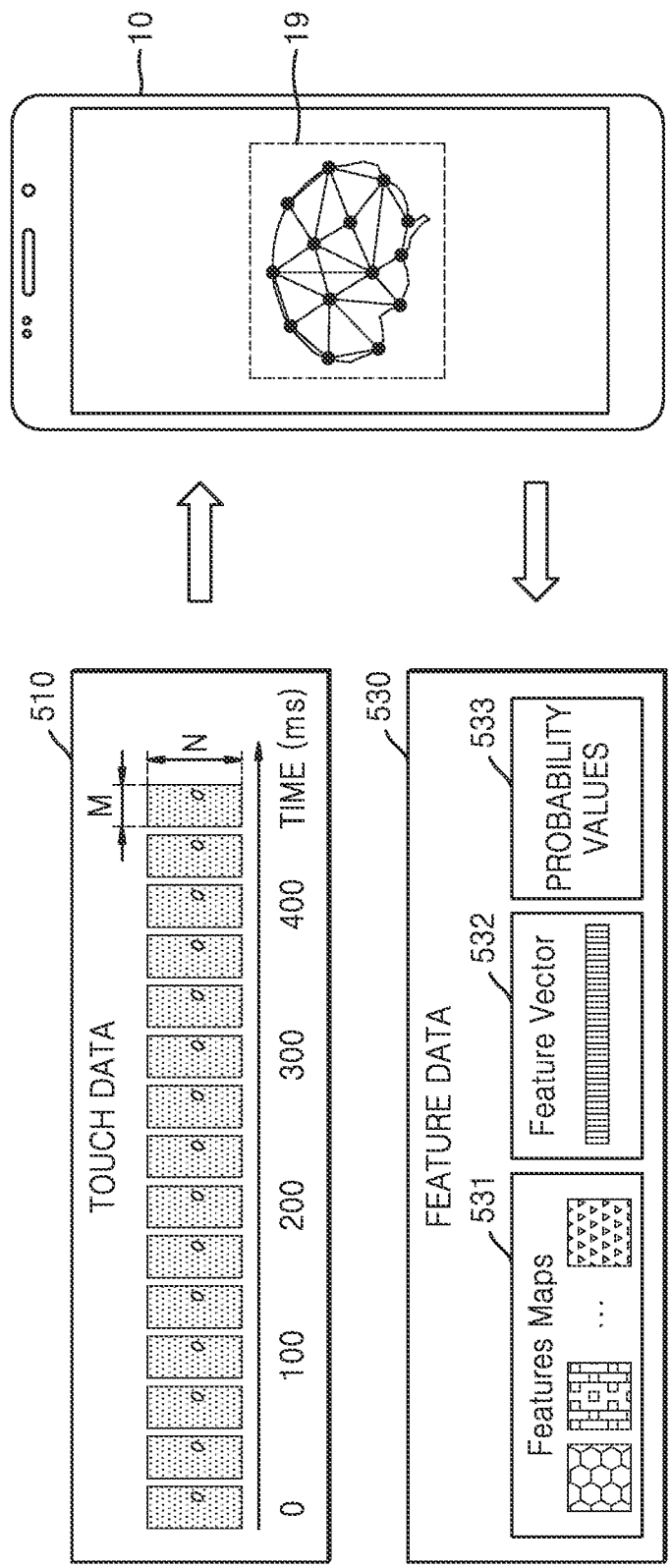
FIG. 5 is a diagram for describing a method, performed by an electronic device, of obtaining feature data from touch data applied to an artificial intelligence model, according to an embodiment.

FIG. 5 is a diagram for describing a method, performed by an electronic device, of obtaining feature data from touch data applied to an artificial intelligence model, according to an embodiment.

Referring to FIG. 5, the electronic device 10 may obtain feature data 530 of touch data 510 from the artificial intelligence model 19 by applying the touch data 510 to the artificial intelligence model 19. For example, the electronic device 10 may obtain probability values 533 that a feature map 531, a feature vector 532, and the feature data 530 of the touch data 510 output from the artificial intelligence model 19 correspond to respective types of touch input. The artificial intelligence model 19 may include a feature extraction model pre-trained to obtain the feature data 530 of the touch data 510. The feature extraction model may be an artificial intelligence model generated separately from the artificial intelligence model of FIG. 10 for identifying training data and the artificial intelligence model of FIG. 11 for identifying the type of a user input. The feature extraction model may exchange data with the artificial intelligence model of FIG. 10 for identifying training data to identify a training data set similar to the input data of the user. In addition, the feature extraction model may exchange data with the artificial intelligence model of FIG. 11 for identifying the type of a user input in order to perform an operation corresponding to the user input.

According to an embodiment, the artificial intelligence model 19 may configure the touch data 510 as convolutional layers. The artificial intelligence model 19 may obtain the feature map 531 of the touch data 510, from the convolutional layers.

According to an embodiment, the artificial intelligence model 19 may obtain the feature vector 532 from the feature map 531 by performing vectorization or pooling on the feature map 531.

According to an embodiment, the artificial intelligence model 19 may obtain the probability values 533 that the touch input of the user corresponds to the respective types of touch input, by fully connecting the feature vector 532. For example, the artificial intelligence model 19 may obtain the probability values 533 that the touch input of the user corresponds to the respective types of touch input such as a normal touch, a long touch, a force touch, or a drag.

According to an embodiment, the artificial intelligence model 19 may output the feature data 530 of the touch data 510 to the electronic device 10. For example, the artificial intelligence model 19 may output, to the electronic device 10, as the feature data 530, at least one of the feature map 531 of the touch data 510, the feature vector 532 of the touch data 510, and the probability values 533 that the touch data 510 corresponds to the respective types of touch input.

According to an embodiment, the electronic device 10 may store the feature data 530 output from the artificial intelligence model 19, in the memory.

According to an embodiment, the electronic device 10 may transmit, to the server 20, the feature data 530 output from the artificial intelligence model 19.

Figure 6:
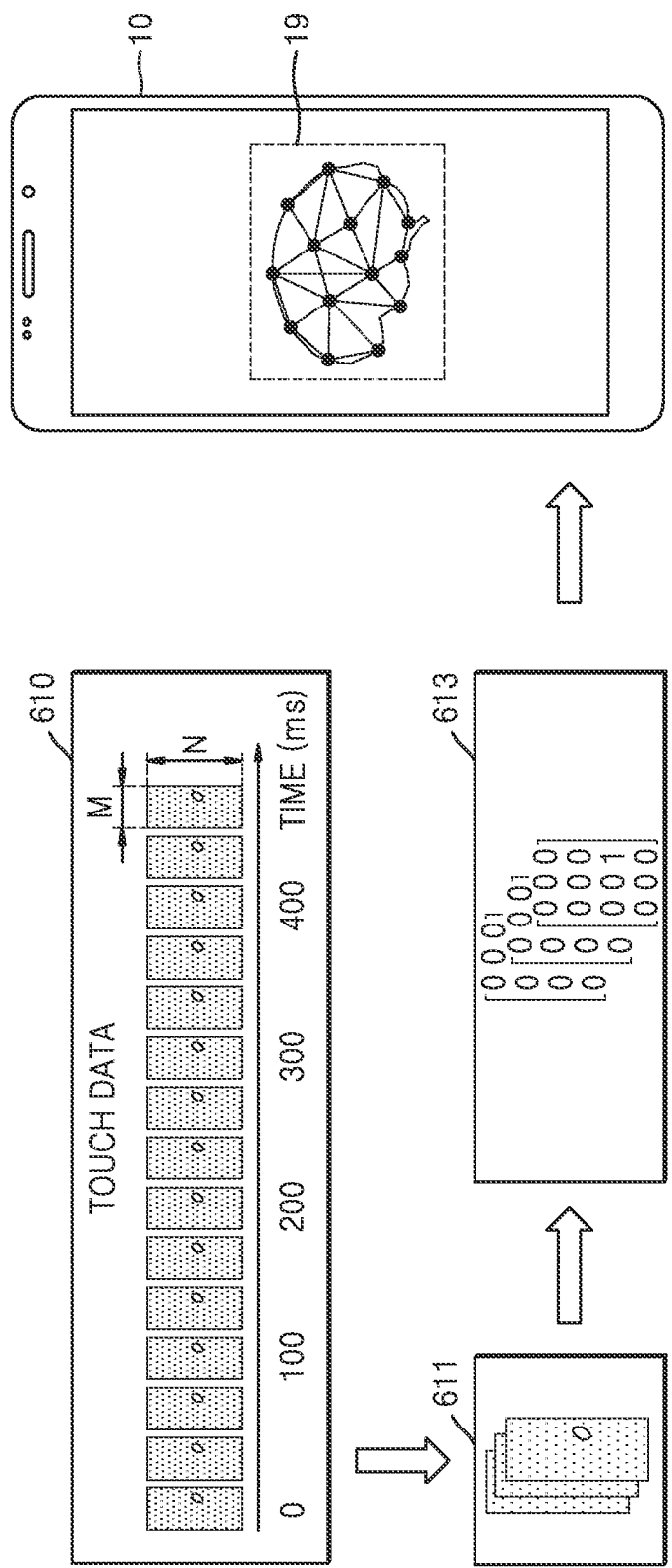
FIG. 6 is a diagram for describing a method, performed by an electronic device, of preprocessing touch data applied to an artificial intelligence model, according to an embodiment.

FIG. 6 is a diagram for describing a method, performed by an electronic device, of preprocessing touch data applied to an artificial intelligence model, according to an embodiment.

Referring to FIG. 6, the electronic device 10 may perform preprocessing on touch data 610 and apply a result of the preprocessing to the artificial intelligence model 19. For example, the electronic device 10 may perform preprocessing on the touch data 610 to be in a format applicable to the convolutional layers of the artificial intelligence model 19. The preprocessing performed by the electronic device 10 may be performed by the electronic device 10 applying the touch data 610 to the artificial intelligence model 19.

According to an embodiment, the electronic device 10 may obtain touch data sets by segmenting the touch data 610 based on a preset time period. In this case, the obtained touch data set may include touch data for one type of user input. The electronic device 10 may segment the touch data 610 based on a time interval between touch inputs during which no touch input is received.

According to an embodiment, as a result of preprocessing the touch data 610, the electronic device 10 may obtain a touch region image representing a region on the touch screen in which a touch input of the user is received. The electronic device 10 may obtain a touch region image set 611 corresponding to each of the touch data sets segmented based on the preset time period, as a result of the preprocessing. The electronic device 10 may apply the touch region image set 611 to the artificial intelligence model 19.

According to an embodiment, the electronic device 10 may obtain a matrix corresponding to the touch data 610, as a result of preprocessing the touch data 610. For example, the electronic device 10 may obtain the matrix corresponding to the touch data 610 by applying 1 to a region in which a touch input of the user is received, and 0 to a region in which a touch input of the user is not received, in the touch data 610. Alternatively, the electronic device 10 may obtain the matrix corresponding to the touch data 610 by converting, into an element of the matrix, each of regions having a real number between 0 and 1 obtained by normalizing a microcurrent or electric field value measured according to a touch input of the user. In this case, the electronic device 10 may obtain an M×N matrix from the touch data 610 segmented into M×N regions. The electronic device may obtain matrices 613 corresponding to the respective touch data sets, as a result of the preprocessing. The electronic device 10 may apply the matrices 613 to the artificial intelligence model 19.

Figure 7:
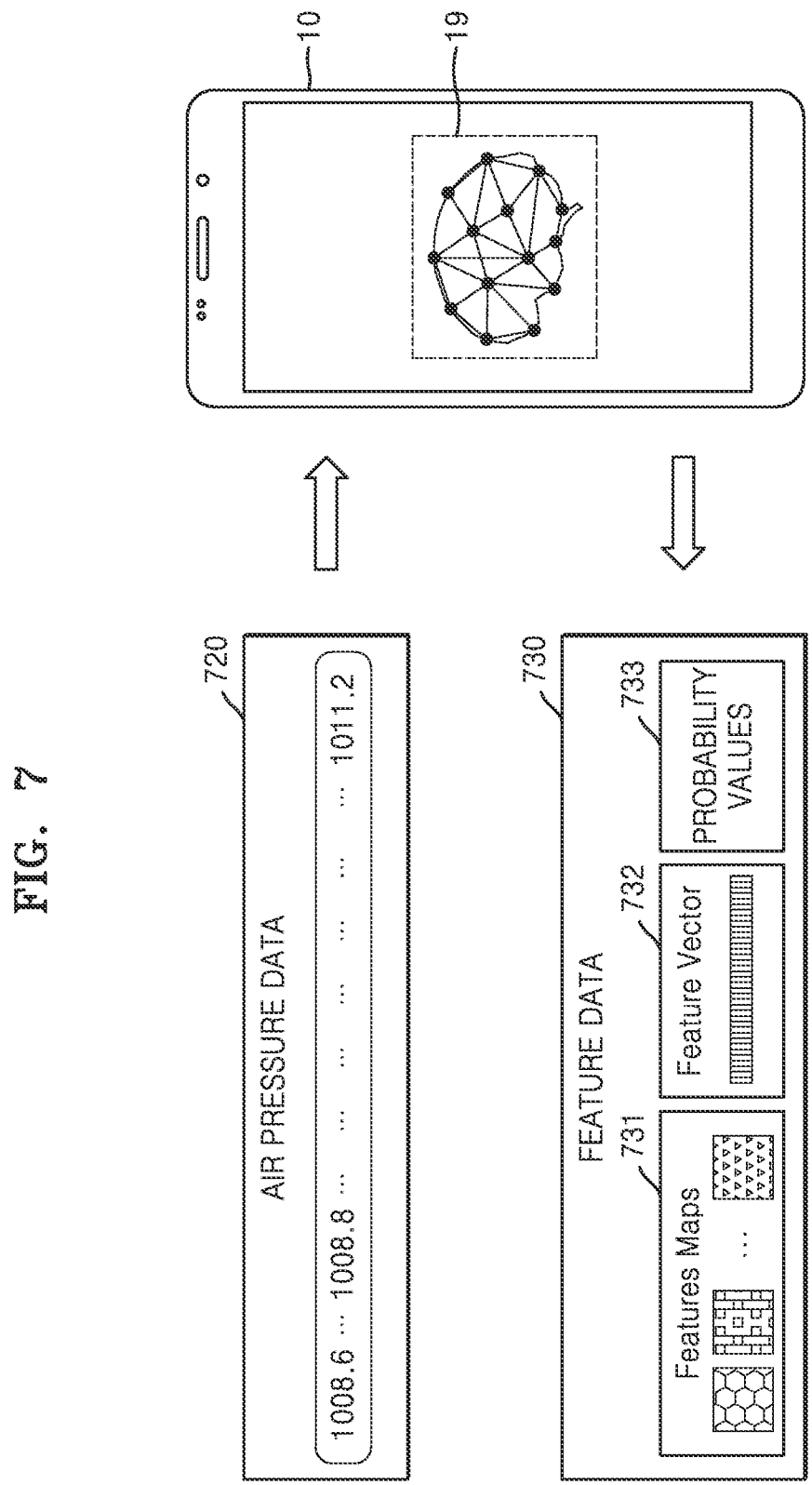
FIG. 7 is a diagram for describing a method, performed by an electronic device, of obtaining feature data from air pressure data to be applied to an artificial intelligence model, according to an embodiment.

FIG. 7 is a diagram for describing a method, performed by an electronic device, of obtaining feature data from air pressure data to be applied to an artificial intelligence model, according to an embodiment.

Referring to FIG. 7, the electronic device 10 may obtain feature data 730 of air pressure data 720 from the artificial intelligence model 19 by applying the air pressure data 720 to the artificial intelligence model 19. For example, the electronic device 10 may obtain probability values 733 that a feature map 731, a feature vector 732, and the feature data 730 of the air pressure data 720 output from the artificial intelligence model 19 correspond to respective types of touch input.

According to an embodiment, the artificial intelligence model 19 may configure the air pressure data 720 as convolutional layers. The artificial intelligence model 19 may obtain the feature map 731 of the air pressure data 720, from the convolutional layers.

According to an embodiment, the artificial intelligence model 19 may obtain the feature vector 732 from the feature map 731 by performing vectorization or pooling on the feature map 731.

According to an embodiment, the artificial intelligence model 19 may obtain the probability values 733 that the touch input of the user corresponds to the respective types of touch input, by fully connecting the feature vector 732. For example, the artificial intelligence model 19 may obtain the probability values 733 that the touch input of the user corresponds to the respective types of touch input such as a normal touch, a long touch, a force touch, or a drag.

According to an embodiment, the artificial intelligence model 19 may output the feature data 730 of the air pressure data 720 to the electronic device 10. For example, the artificial intelligence model 19 may output, to the electronic device 10, as the feature data 730, at least one of the feature map 731 of the air pressure data 720, the feature vector 732 of the air pressure data 720, and the probability values 733 that the air pressure data 720 corresponds to the respective types of touch input.

According to an embodiment, the electronic device 10 may store the feature data 730 output from the artificial intelligence model 19, in the memory.

According to an embodiment, the electronic device 10 may transmit, to the server 20, the feature data 730 output from the artificial intelligence model 19.

Figure 8:
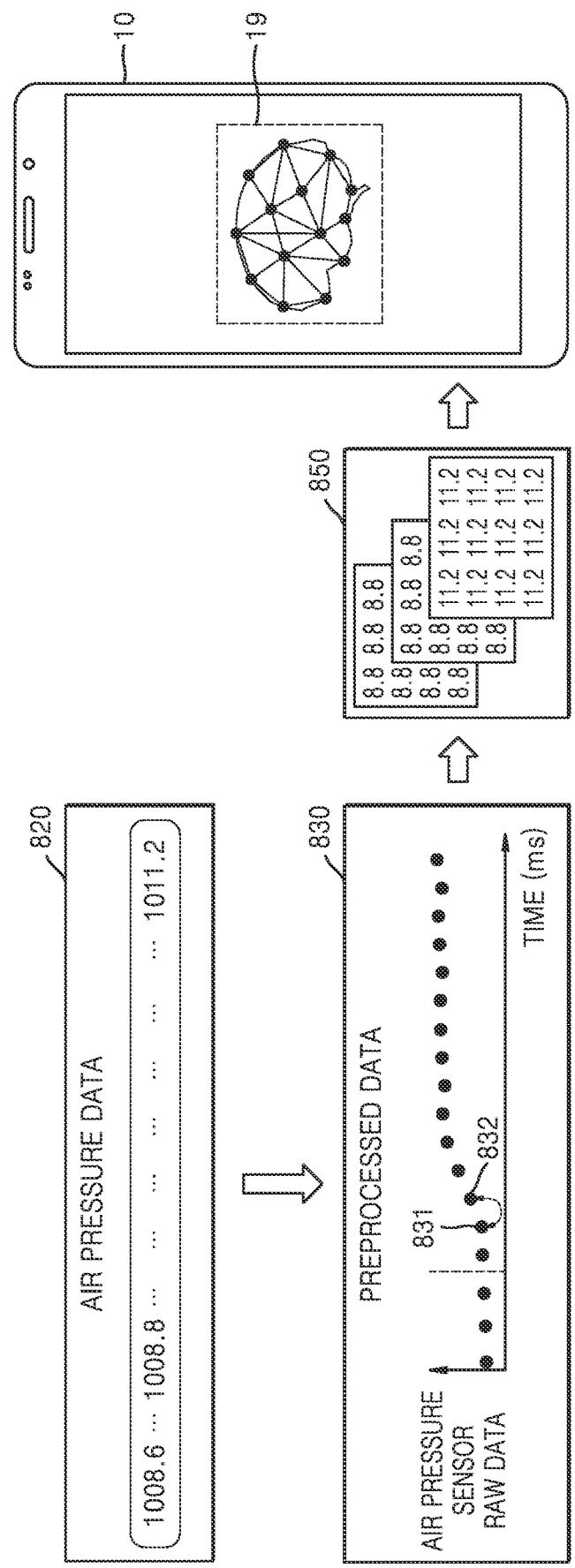
FIG. 8 is a diagram for describing a method, performed by an electronic device, of preprocessing air pressure data applied to an artificial intelligence model, according to an embodiment.
Figure 9:
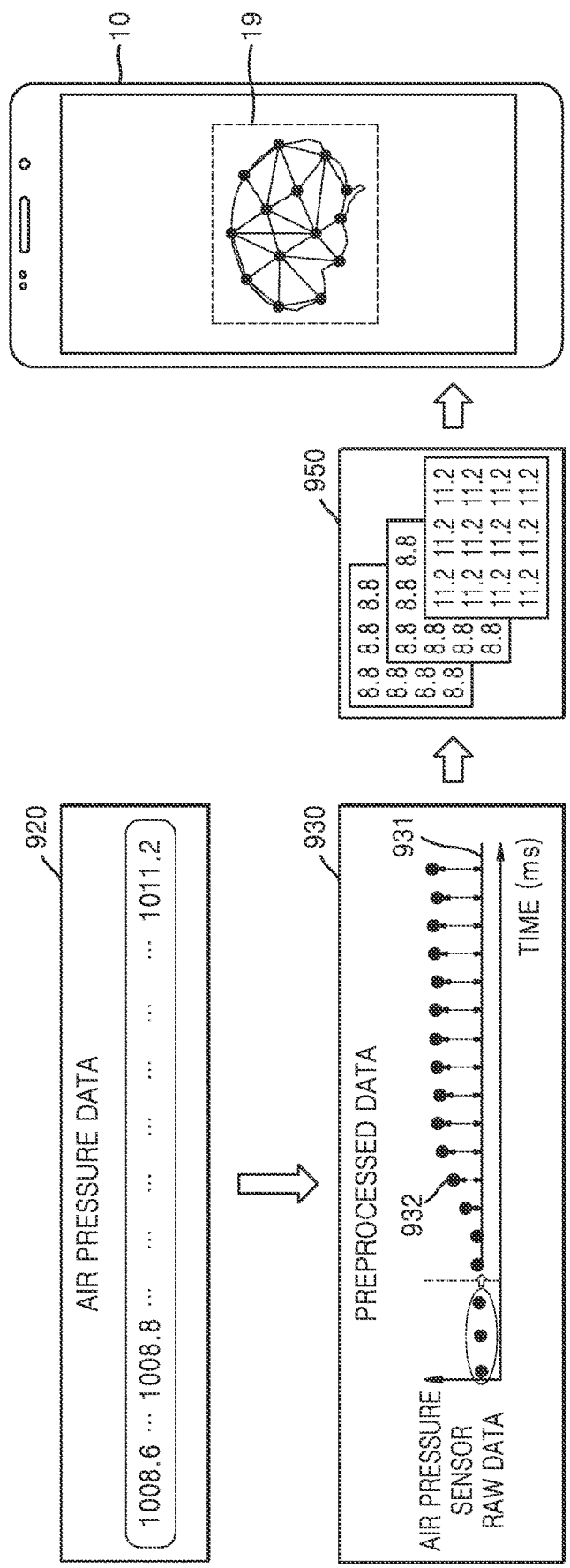
FIG. 9 is a diagram for describing a method, performed by an electronic device, of preprocessing air pressure data applied to an artificial intelligence model, according to an embodiment.

FIGS. 8 and 9 are diagrams for describing a method, performed by an electronic device, of preprocessing air pressure data applied to an artificial intelligence model, according to an embodiment.

Referring to FIGS. 8 and 9, the electronic device 10 may perform preprocessing on air pressure data 820 or 920 and apply a result of the preprocessing to the artificial intelligence model 19. The electronic device 10 may perform preprocessing on the air pressure data 820 or 920 to obtain preprocessed data 830 or 930. For example, the electronic device 10 may perform preprocessing on the air pressure data 820 or 920 to be in a format applicable to the convolutional layers of the artificial intelligence model 19. The preprocessing performed by the electronic device 10 may be performed by the electronic device 10 applying the air pressure data 820 or 920 to the artificial intelligence model 19.

Referring to FIG. 8, the electronic device 10 may obtain matrices 850 corresponding to the air pressure data 820, by performing preprocessing on the air pressure data 820.

According to an embodiment, the electronic device 10 may obtain, from the air pressure data 820, a change value in an internal air pressure value of the electronic device 10 in a preset time period. For example, the electronic device 10 may obtain the difference between an air pressure value 831 at a first time interval and an air pressure value 832 at a second time interval.

According to an embodiment, the electronic device 10 may obtain the matrices 850 from change values in the air pressure inside the electronic device 10. For example, the electronic device 10 may obtain a matrix corresponding to the second time interval and having the difference between the air pressure value 832 at the second time interval and the air pressure value 831 at the first time interval. Also, the electronic device 10 may obtain a matrix corresponding to the first time interval having a value of 0.

Referring to FIG. 9, the electronic device 10 may obtain matrices 950 by performing preprocessing on the air pressure data 920.

According to an embodiment, the electronic device 10 may obtain, from the air pressure data 920, a change value in the air pressure inside the electronic device 10 in a preset time period. For example, the electronic device 10 may obtain the difference between an air pressure value at a time interval during which a touch input is received, and an air pressure value at a time interval during which no touch input is received. In detail, the electronic device 10 may obtain the difference between an air pressure value 931 at a first time interval during which no touch input is received, and an air pressure value 932 at a second time interval during which a touch input is received.

According to an embodiment, the electronic device 10 may obtain the matrices 950 from change values in the air pressure inside the electronic device 10. For example, the electronic device 10 may obtain the matrices 950 having the differences between air pressure values at time intervals during which touch inputs are received, and the air pressure value at the time interval during which no touch input is received. In detail, the electronic device 10 may obtain a matrix having the difference between the air pressure value 931 at the first time interval during which no touch input is received, and the air pressure value 932 at the second time interval during which the touch input is received.

Referring to FIGS. 8 and 9, the electronic device 10 may apply the obtained matrices 850 or 950 to the artificial intelligence model 19.

Figure 10:
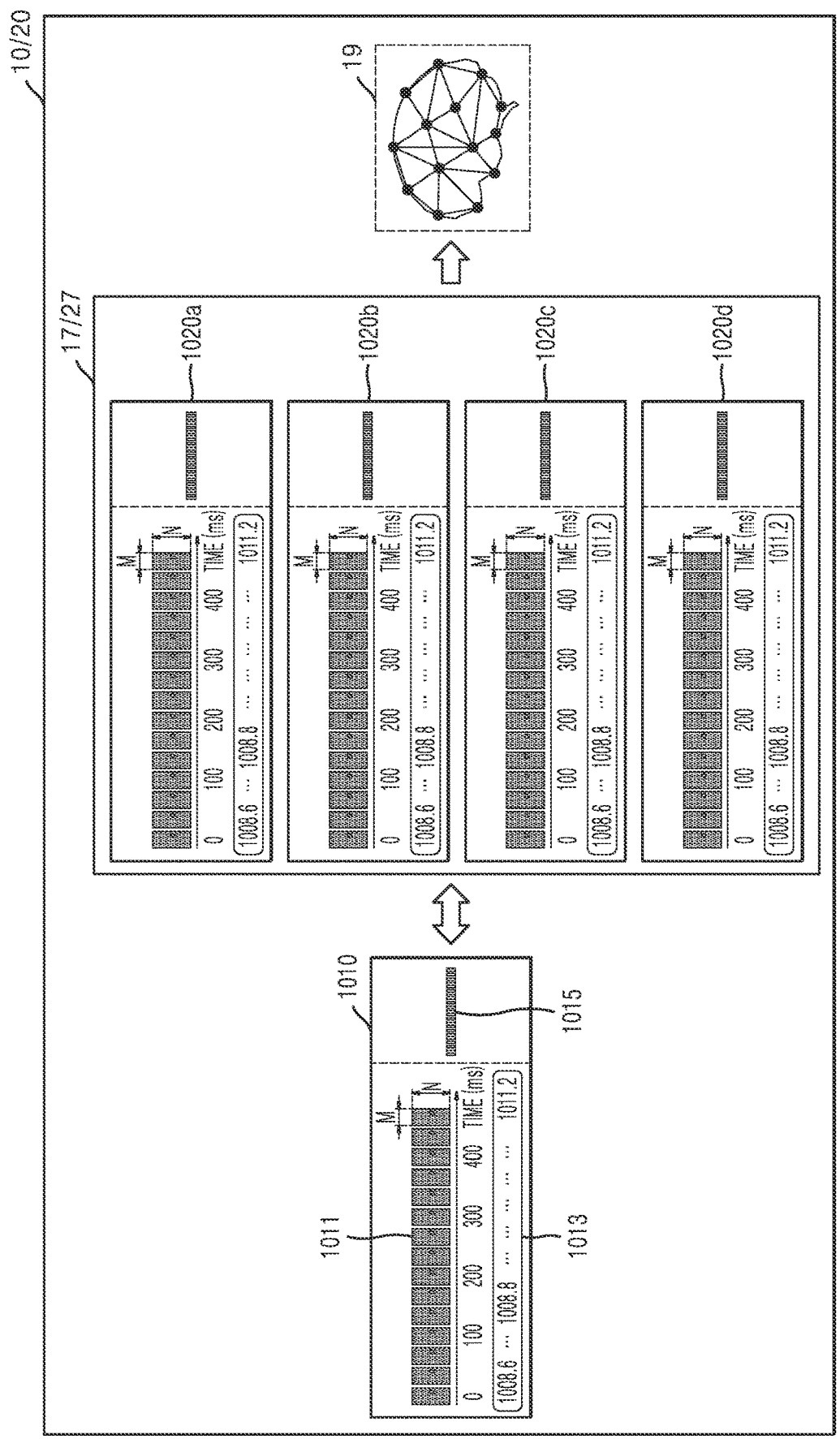
FIG. 10 is a diagram for describing a method, performed by any one of an electronic device or a server, of identifying training data similar to touch data of a user and training an artificial intelligence model by using the identified training data, according to an embodiment.

FIG. 10 is a diagram for describing a method, performed by any one of an electronic device or a server, of identifying a training data set similar to user input data and training an artificial intelligence model by using the identified training data, according to an embodiment.

The electronic device 10 may obtain input data 1010 of the user and compare the input data 1010 with a plurality of training data sets 1020a, 1020b, 1020c, and 1020d pre-stored in a memory 17, to select a first training data set similar to the input data 1010 from the plurality of training data sets 1020a, 1020b, 1020c, and 1020d.

According to an embodiment, the electronic device 10 may compare touch data 1011 included in the input data 1010 with touch data included in each of the plurality of training data sets 1020a, 1020b, 1020c, and 1020d, to select the first training data set including touch data similar to the touch data 1011.

According to an embodiment, the electronic device 10 may compare the touch data 1011 corresponding to respective types of touch input included in the input data 1010 with the touch data corresponding to respective types of touch input included each of the plurality of training data sets 1020a, 1020b, 1020c, and 1020d, to select the first training data set including the touch data similar to the touch data 1011. In detail, the electronic device 10 may compare touch data of the user that is input as a force touch with touch data for a force touch included in each of the plurality of training data sets 1020a, 1020b, 1020c, and 1020d, to select the first training data set. In addition, the electronic device 10 may compare touch data of the user that is input as a long touch with touch data for a long touch included in each of the plurality of training data sets 1020a, 1020b, 1020c, and 1020d, to select the first training data set.

As another example, the electronic device 10 may compare a touch region image obtained from the touch data 1011 with a touch region image obtained from the touch data included in each of the plurality of training data sets 1020a, 1020b, 1020c, and 1020d, select a first training data set including touch data similar to the touch data 1011. In detail, the electronic device 10 may select the first training data set, based on a result of comparing the shape (e.g., an edge) of a region in which a touch input included in the touch data 1011 is received, with the shape of a region in which a touch input included in each of the plurality of training data sets 1020a, 1020b, 1020c, and 1020d is received.

As another example, the electronic device 10 may select a first training data set including touch data similar to the touch data 1011, by comparing the area of the region in which the touch input included in the touch data 1011 is received, with the area of the region in which the touch input included in each of the plurality of training data sets 1020a, 1020b, 1020c, and 1020d is received. In this case, the electronic device 10 may select the first training data set, based on a result of comparing the maximum areas of the regions with each other.

As another example, the electronic device 10 may identify a first training data set including touch data similar to the touch data 1011, by a result of comparing a time interval during which the touch input included in the touch data 1011 is received, with a time interval during which the touch input included in each of the plurality of training data sets 1020a, 1020b, 1020c, and 1020d is received.

As another example, the electronic device 10 may identify a first training data set, based on a result of comparing feature data of the touch data 1011 with feature data of each of the plurality of training data sets 1020a, 1020b, 1020c, and 1020d. In this case, the feature data may include a feature map of the touch data, a feature vector of the touch data, and probability values that the touch data corresponds to respective types.

As a specific example, the electronic device 10 may obtain a first feature vector 1015 of the touch data 1011 by applying the touch data 1011 to an artificial intelligence model. The electronic device 10 may apply, to the artificial intelligence model, a second feature vector of each of the plurality of training data sets 1020a, 1020b, 1020c, and 1020d and the first feature vector 1015, to identify correlations between the first feature vector 1015 and the second feature vectors. The electronic device 10 may identify the first training data set corresponding to the second feature vector having the highest correlation with the first feature vector 1015. Alternatively, the electronic device 10 may identify the first training data set, based on a result of comparing a representative value (e.g., an average, a median, or a mode) of the first feature vector 1015 with a representative value (e.g. an average, a median, or a mode) of each of the second feature vectors.

According to an embodiment, the electronic device 10 may identify a training data set similar to user input data from among the plurality of training data sets 1020a, 1020b, 1020c, and 1020d, by using air pressure data together with touch data.

For example, the electronic device 10 may identify a training data set similar to the user input data, based on a result of comparing the first feature vector 1015 obtained by applying the touch data 1011 and air pressure data 1013 to one artificial intelligence model, with the second feature vector of each of the plurality of training data sets 1020a, 1020b, 1020c, and 1020d.

In detail, the electronic device 10 may identify the training data set similar to the user input data, based on a result of comparing a first feature vector obtained by concatenating the touch data with the air pressure data and applying a result of the concatenating to the artificial intelligence model, with the second feature vectors, or based on a result of comparing a first feature vector obtained by alternately arranging the touch data and the air pressure data and applying a result of the arranging to the artificial intelligence model, with the second feature vectors.

As another example, the electronic device 10 may identify a training data set similar to the user input data, based on a result of comparing feature vectors obtained by applying the touch data 1011 and air pressure data 1013 to separate artificial intelligence models, respectively, with feature vectors of touch data and air pressure data included in each of the plurality of training data sets 1020a, 1020b, 1020c, and 1020d.

In detail, the electronic device 10 may obtain a first feature vector by applying the touch data 1011 to a first artificial intelligence model. Also, the electronic device 10 may obtain a third feature vector by applying the air pressure data 1013 to a second artificial intelligence model. The electronic device 10 may compare the first feature vector with second feature vectors obtained from pieces of touch data included in the plurality of training data sets 1020a, 1020b, 1020c, and 1020d, to identify a first training data set corresponding to the second feature vector having the highest correlation with the first feature vector. The electronic device 10 may compare the third feature vector with fourth feature vectors obtained from pieces of air pressure data included in the plurality of training data sets 1020a, 1020b, 1020c, and 1020d, to identify a second training data set corresponding to the fourth feature vector having the highest correlation with the third feature vector. The electronic device may identify a training data set to be used to train an artificial intelligence model, from among the first training data set and the second training data set, by using weight values.

According to an embodiment, the electronic device 10 may identify a first training data set similar to user input data, from among the plurality of training data sets 1020a, 1020b, 1020c, and 1020d. The electronic device 10 may identify a first artificial intelligence model corresponding to the first training data set, from among a plurality of artificial intelligence models corresponding to the plurality of training data sets 1020a, 1020b, 1020c, and 1020d, respectively. Each of the plurality of artificial intelligence models may be pre-trained based on each of the training data sets 1020a, 1020b, 1020c, and 1020d classified based on training data collected from various users having various touch input characteristics (e.g., age, gender, race, weight, or frequently used finger).

The electronic device 10 may transmit input data 1010 of the user to the server 20. The server 20 may select the first training data set similar to the input data 1010 from among the plurality of training data sets 1020a, 1020b, 1020c, and 1020d pre-stored in a DB 27, by comparing the input data 1010 with the plurality of training data sets 1020a, 1020b, 1020c, and 1020d.

A method, performed by the server 20, of identifying a training data set may be inferred from the method, performed by the electronic device 10, of identifying a training data set, and thus, redundant descriptions thereof are omitted. In addition, a method, performed by the server 20, of identifying a first artificial intelligence model corresponding to a first training data set may be inferred from the method, performed by the electronic device 10, of identifying a first artificial intelligence model, and thus, redundant descriptions thereof are omitted.

The electronic device 10 may train the artificial intelligence model 19 based on a training data set similar to user input data.

According to an embodiment, the electronic device 10 may train, based on the training data set similar to the user input data, an artificial intelligence model that has not been trained based on training data.

According to an embodiment, the electronic device 10 may train an artificial intelligence model for initial setting, based on the training data set similar to the user input data. The artificial intelligence model for initial setting may be a general-purpose artificial intelligence model trained based on at least some of the plurality of training data sets.

According to an embodiment, the electronic device 10 may obtain one personalized artificial intelligence model by training one artificial intelligence model, based on a training data set including training data for touch data and air pressure data.

According to an embodiment, the electronic device 10 may obtain two or more personalized artificial intelligence models by training separate artificial intelligence models based on training data for touch data and training data for air pressure data, respectively. In detail, the electronic device 10 may obtain a first personalized artificial intelligence model and a second personalized artificial intelligence model by training a first artificial intelligence model based on first training data for touch data included in the first training data set, and training a second artificial intelligence model based on second training data for air pressure data included in the first training data set.

According to an embodiment, the electronic device 10 may obtain a personalized artificial intelligence model by reading out, from a memory, a first artificial intelligence model corresponding to a first training data set among a plurality of artificial intelligence models that are pre-trained based on the plurality of training data sets, respectively, and replacing the artificial intelligence model built in the electronic device 10 with the first artificial intelligence model read out.

The server 20 may train an artificial intelligence model based on a training data set similar to user input data. A method, performed by the server 20, of identifying training data may be inferred from the method, performed by the electronic device 10, of identifying training data, and thus, redundant descriptions thereof are omitted.

The electronic device 10 may obtain a personalized artificial intelligence model by receiving an artificial intelligence model trained by the server 20, and replacing the artificial intelligence model built in the electronic device 10 with the received artificial intelligence model. Alternatively, the electronic device 10 may obtain a personalized artificial intelligence model by receiving parameters of an artificial intelligence model trained by the server 20, and updating the artificial intelligence model built in the electronic device 10 by using the received parameters.

According to an embodiment, the electronic device 10 may obtain a personalized artificial intelligence model by receiving, from the server 20, a first artificial intelligence model corresponding to a first training data set among a plurality of artificial intelligence models that are pre-trained based on the plurality of training data sets, respectively, and replacing the artificial intelligence model built in the electronic device 10 with the received first artificial intelligence model.

Figure 11:
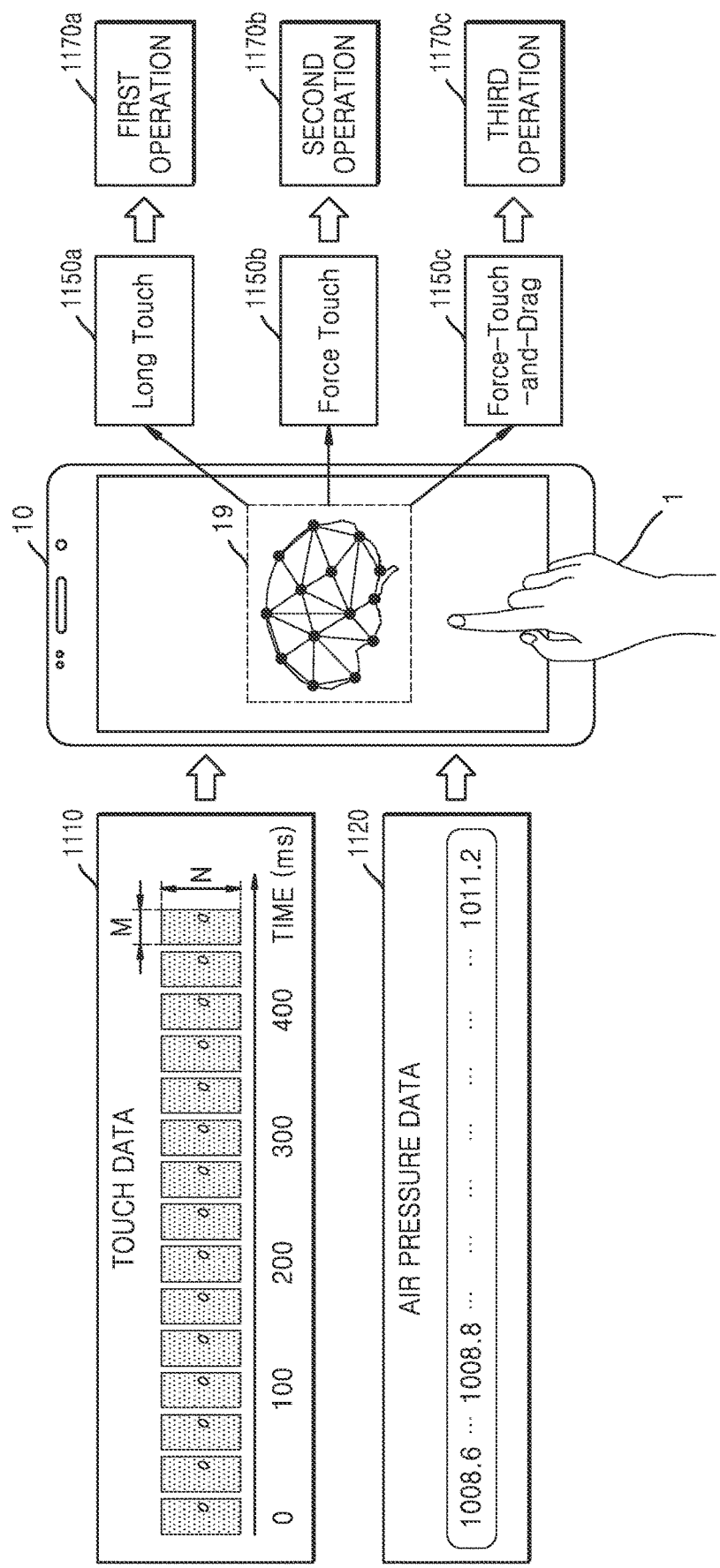
FIG. 11 is a diagram for describing a method, performed by an electronic device, of identifying a type of user input by using an artificial intelligence model, and performing an operation corresponding to the identified type, according to an embodiment.

FIG. 11 is a diagram for describing a method, performed by an electronic device, of identifying the type of a user input by using an artificial intelligence model, and performing an operation corresponding to the identified type, according to an embodiment.

Referring to FIG. 11, the electronic device 10 may receive, from the user 1, a touch input for performing a certain operation. For example, the electronic device 10 may receive a touch input of the user 1, such as a normal touch, a long touch, a force touch, or a drag, for performing a certain operation such as an operation of selecting an object corresponding to a region in which a touch is input through the touch screen, an operation of displaying a pop-up screen for performing an additional operation on an object located in a region in which a touch is input, an operation of providing a shortcut functional, an operation of providing a function of moving the position of an object, or an operation of controlling a hardware function of the electronic device 10.

The electronic device 10 may obtain touch data 1110 and air pressure data 1120 from the touch input received from the user 1. For example, the electronic device 10 may obtain the touch data 1110 related to a region in which the touch input of the user is received through the touch screen, at a preset time interval. Also, while obtaining the touch data 1110, the electronic device 10 may obtain the air pressure data 1120 related to a change in the air pressure inside the electronic device 10 caused by the touch input of the user 1.

The electronic device 10 may identify the type of the user input by applying at least one of the touch data 1110 and the air pressure data 1120 to the artificial intelligence model 19. For example, the electronic device 10 may identify, from probability values that the user input corresponds to a long touch 1150a, a force touch 1150b, and a force-touch-and-drag 1150c, respectively, the type of the user input as a type such as the long touch 1150a, the force touch 1150b, or the force-touch-and-drag 1150c.

According to an embodiment, the electronic device 10 may apply at least one of the touch data 1110 and the air pressure data 1120 to one artificial intelligence model, to identify the type of the user input by using probability values output from the artificial intelligence model.

The electronic device 10 may perform an operation corresponding to the identified type of the user input.

For example, the electronic device 10 may perform a first operation 1170a in response to the user input being identified as the long touch 1150a. As a specific example, in response to the user input being identified as the long touch 1150a, the electronic device 10 may perform an operation of displaying a pop-up screen for performing an additional operation on an object located in the region in which the touch is input.

As another example, the electronic device 10 may perform a second operation 1170b in response to the user input being identified as the force touch 1150b. As a specific example, in response to the user input being identified as the force touch 1150b, the electronic device 10 may perform an operation of providing a shortcut function.

As another example, the electronic device 10 may perform a third operation 1170c in response to the user input being identified as the force-touch-and-drag 1150c. As a specific example, in response to the user input being identified as a force-touch-and-vertical-drag, the electronic device 10 may perform an operation of adjusting the brightness of the display. In response to a user input being identified as a force-touch-and-horizontal-drag, the electronic device 10 may perform an operation of adjusting the intensity of an output sound.

Figure 12:
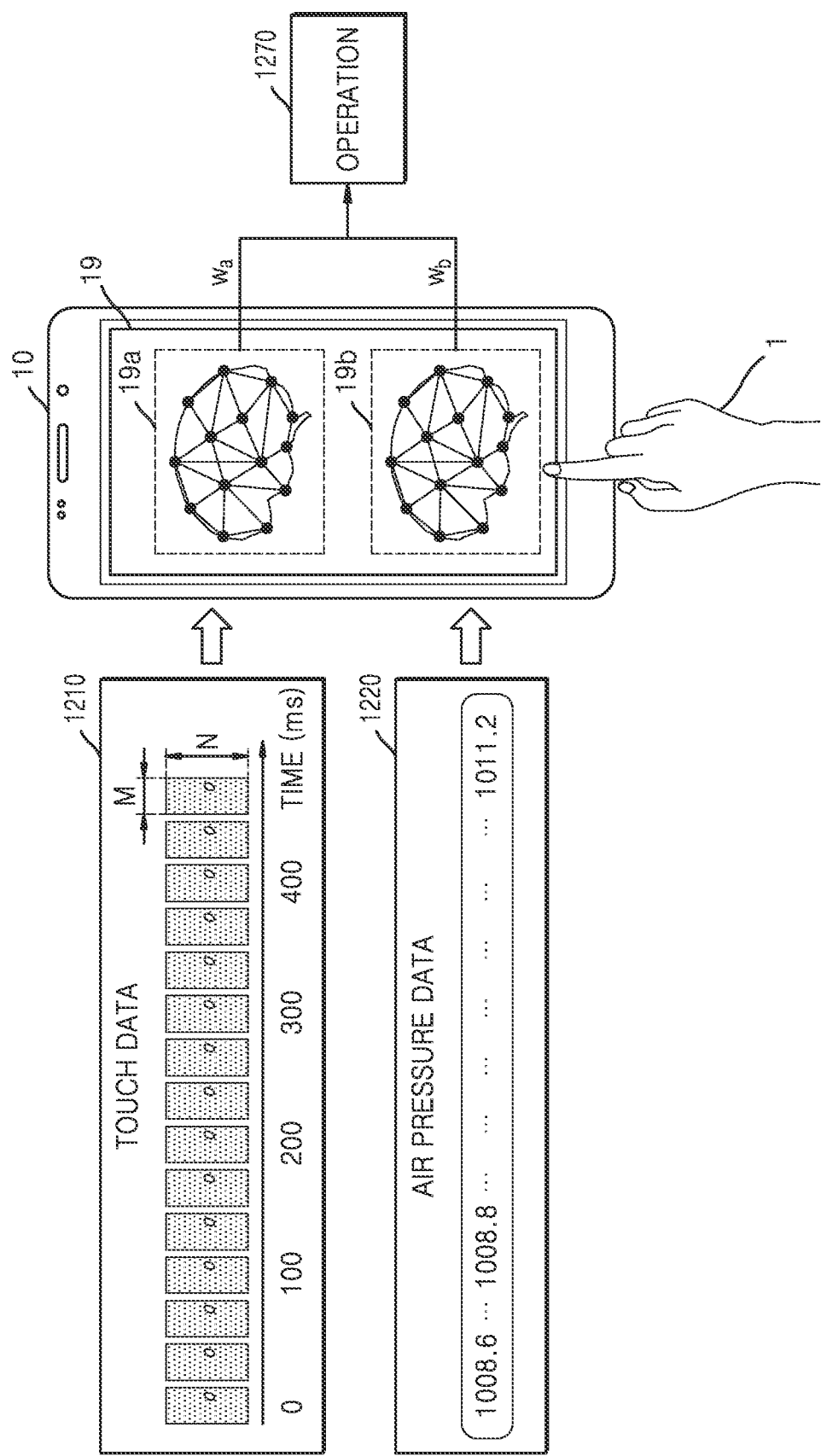
FIG. 12 is a diagram for describing a method, performed by an electronic device, of identifying a type of user input by using an artificial intelligence model, and performing an operation corresponding to the identified type, according to an embodiment.

FIG. 12 is a diagram for describing a method, performed by an electronic device, of identifying the type of a user input by using an artificial intelligence model, and performing an operation corresponding to the identified type, according to an embodiment.

Referring to FIG. 12, the electronic device 10 may receive, from the user 1, a touch input for performing a certain operation. The electronic device 10 may obtain touch data 1210 and air pressure data 1220 from the touch input received from the user 1.

The electronic device 10 may identify the type of the user input by applying weight values to probability values obtained by applying the touch data and the air pressure data to separate artificial intelligence models, respectively.

For example, the electronic device 10 may apply a first weight value $w_a$ to a first probability value obtained by applying the touch data 1210 to a first artificial intelligence model 19a, and apply a second weight value $w_b$ to a second probability value obtained by applying the air pressure data 1220 to a second artificial intelligence model 19b. The electronic device 10 may identify the type of the user input corresponding to the higher value among the first probability value and the second probability value to which the weight values $w_a$ and $w_b$ are applied, respectively. The electronic device 10 may perform an operation 1270 corresponding to the identified type of the user input.

According to an embodiment, the weight values $w_a$ and $w_b$ applied to the respective probability values may be determined based on the similarity between input data of the user and a training data set.

For example, the first weight value $w_a$ may be determined based on the similarity between the touch data obtained in operation S210 of FIG. 2 and the touch data of the training data set identified in operation S220 of FIG. 2. For example, when the similarity is 90%, the first weight value $w_a$ may be 0.9.

As another example, the second weight value $w_b$ may be determined based on the similarity between the air pressure data obtained in operation S210 of FIG. 2 and the air pressure data of the training data set identified in operation S220 of FIG. 2. For example, when the similarity is 60%, the second weight value $w_b$ may be 0.6.

According to an embodiment, the similarity between the input data of the user and the training data set may be obtained from the correlation between a feature vector obtained from the input data of the user and a feature vector of the training data set.

According to an embodiment, the first probability value obtained by applying the touch data 1210 to the first artificial intelligence model 19a may include a first long-touch probability value that the touch input of the user corresponds to a long touch, and a first force-touch probability value that the touch input of the user corresponds to a force touch. In addition, the second probability value obtained by applying the air pressure data 1220 to the second artificial intelligence model 19b may include a second long-touch probability value that the touch input of the user corresponds to a long touch, and a second force-touch probability value that the touch input of the user corresponds to a force touch.

In addition, the weight value $w_a$ applied to the first probability value may include a first weight value $w_1$ applied to the first long-touch probability value, and a second weight value $w_2$ applied to the first force-touch probability value. The weight value $w_b$ applied to the second probability value may include a third weight value $w_3$ applied to the second long-touch probability value, and a fourth weight value $w_4$ applied to the second force-touch probability value. In this case, the weight values may be determined such that the sum of the first weight value $w_1$ and the second weight value $w_2$ is 1, and the sum of the third weight value $w_3$ and the fourth weight value $w_4$ is 1.

According to an embodiment, in a case in which the difference between the first force-touch probability value and the first long-touch probability value is greater than or equal to a preset value (e.g., 0.2), the electronic device 10 may determine a weight value $w_a$ applied to the first probability value as 1, and determine a weight value $w_b$ applied to the second probability value as 0. The electronic device 10 may determine the first weight value $w_1$ and the second weight value $w_2$ as the same value (e.g., 0.5).

In addition, in a case in which the difference between the first force-touch probability value and the first long-touch probability value is less than the preset value (e.g., 0.2), the electronic device 10 may identify the type of the user input corresponding to the higher value among the sum of the first long-touch probability value to which the first weight value $w_1$ is applied and the second long-touch probability value to which the third weight value $w_3$ is applied, and the sum of the first force-touch probability value to which the second weight value $w_2$ is applied and the second force-touch probability value to which the fourth weight value $w_4$ is applied.

According to an embodiment, the weight values $w_a$, $w_b$, $w_1$, $w_2$, $w_3$, and $w_4$ applied to the probability values, respectively, may be preset by a designer of the artificial intelligence model. In detail, the weight values $w_a$, $w_b$, $w_1$, $w_2$, $w_3$, and $w_4$ may be set to appropriate values determined by the designer of the artificial intelligence model through experiments.

For example, as an experiment is performed several times on the electronic device 10 in a certain experiment environment, the weight values $w_a$, $w_b$, $w_1$, $w_2$, $w_3$, and $w_4$ from which optimal probability values may be obtained may be preset.

In addition, in a case in which the reliability of a value measured by the air pressure sensor changes as the air pressure inside the electronic device 10 changes, the weight values $w_a$, $w_b$, $w_1$, $w_2$, $w_3$, and $w_4$ may be adjusted to appropriate values. The weight values $w_a$, $w_b$, $w_1$, $w_2$, $w_3$, and $w_4$ are not limited to the above-described examples, and may be determined according to various methods as values for obtaining optimal probability values.

According to an embodiment, the second artificial intelligence model 19b may output a probability value that the touch input of the user corresponds to a force touch, according to the difference between a maximum and a minimum of the air pressure inside the electronic device 10 caused by the touch input of the user, by using the function of Equation 1.

$$p = \text{sigmoid}(\max(b) - \min(b)) \quad \text{[Equation 1]}$$

Here, b denotes an air pressure value, and p denotes a probability value that the touch input of the user corresponds to a force touch. p denotes a result value by a sigmoid function and may be a value between 0 and 1.

Figure 13:
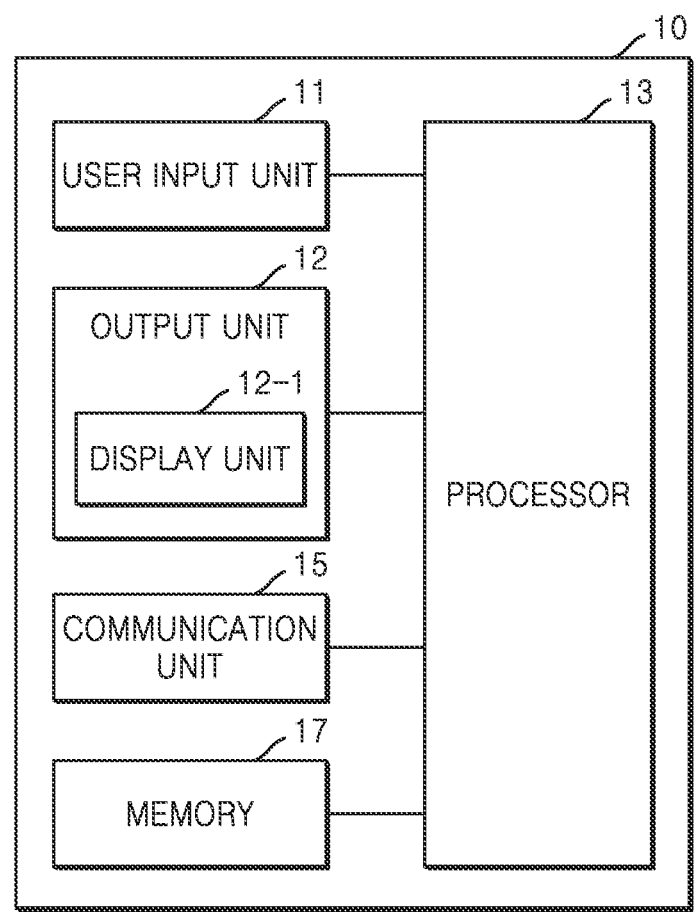
FIG. 13 is a block diagram of an electronic device according to an embodiment.

FIG. 13 is a block diagram of an electronic device according to an embodiment.

Referring to FIG. 13, the electronic device 10 may include a user input unit (or user input interface) 11, an output unit 12, a processor 13, a communication unit (or communication interface) 15, and the memory 17. However, all components illustrated in FIG. 13 are not essential components of the electronic device 10. The electronic device 10 may be implemented by more or less components than the components illustrated in FIG. 13.

The user input unit 11 refers to a unit via which the user inputs data for controlling the electronic device 10. For example, the user input unit 11 may be, but is not limited to, a touch screen, a key pad, a dome switch, a touch pad (e.g., a touch-type capacitive touch pad, a pressure-type resistive overlay touch pad, an infrared sensor-type touch pad, a surface acoustic wave conduction touch pad, an integration-type tension measurement touch pad, a piezoelectric effect-type touch pad), a jog wheel, a jog switch, etc.

The user input unit 11 may receive a user input necessary for the electronic device 10 to perform the embodiments described above with reference to FIGS. 1-12.

The output unit 12 outputs information processed by the electronic device 10. The output unit 12 may output information related to the embodiments described above with reference to FIGS. 1-12. In addition, the output unit 12 may include a display unit 12-1 configured to display an object, a user interface, and a result of performing an operation corresponding to an input of the user.

The processor 13 controls the overall operation of the electronic device 10. For example, the processor 13 may execute at least one instruction stored in the memory 17 to control the overall operation of the user input unit 11, the output unit 12, the communication unit 15, the memory 17, etc.

For example, the processor 13 may execute an instruction stored in a user input data obtaining module 17a to control the electronic device 10 to obtain at least one of touch data and air pressure data from a touch input received from the user. The descriptions of the embodiments provided above with reference to FIGS. 1-12 will be omitted.

As another example, the processor 13 may execute an instruction stored in a training data set identification module 17b to control the electronic device 10 to identify a training data set similar to input data of the user from among a plurality of pre-stored training data sets. The descriptions of the embodiments provided above with reference to FIGS. 1-12 will be omitted.

As another example, the processor 13 may execute an instruction stored in an artificial intelligence training module 17c to train an artificial intelligence model based on a training data set similar to input data of the user. Alternatively, the processor 13 may execute the instruction stored in an artificial intelligence training module 17c to select an artificial intelligence model trained based on a training data set similar to input data of the user. The descriptions of the embodiments provided above with reference to FIGS. 1-12 will be omitted.

As another example, the processor 13 may execute an instruction stored in a user input type identification module 17d to identify the type of a user input received from the user. The descriptions of the embodiments provided above with reference to FIGS. 1-12 will be omitted.

As another example, the processor 13 may execute an instruction stored in an operation execution module 17e to control the electronic device 10 to perform an operation corresponding to the identified type of the user input. The descriptions of the embodiments provided above with reference to FIGS. 1-12 will be omitted.

The processor 13 may be at least one general-purpose processor. In addition, the processor 13 may include at least one processor manufactured to perform a function of an artificial intelligence model. The processor 13 may execute a series of instructions to cause an artificial intelligence model to learn new training data. The processor 13 may executing a software module stored in the memory 17 to perform the function of the artificial intelligence model described above with reference to FIGS. 1-12.

The communication unit 15 may include one or more components configured to allow the electronic device 10 to communicate with another device and the server 20. The other device may be the same computing device as the electronic device 10, but is not limited thereto.

The memory 17 may store at least one instruction and at least one program for the processor 13 to perform processing and control, and may store data input to or output from the electronic device 10.

The memory 17 may include at least one of a memory that temporarily stores data, such as random-access memory (RAM) or static RAM (SRAM), and a data storage that non-temporarily stores data, such as flash memory-type storage medium, a hard disk-type storage medium, a multimedia card micro-type storage medium, a card-type memory (e.g., SD or XD memory), read-only memory (ROM), electrically erasable programmable ROM (EEPROM), programmable RAM (PROM), magnetic memory, a magnetic disk, or an optical disk.

Figure 14:
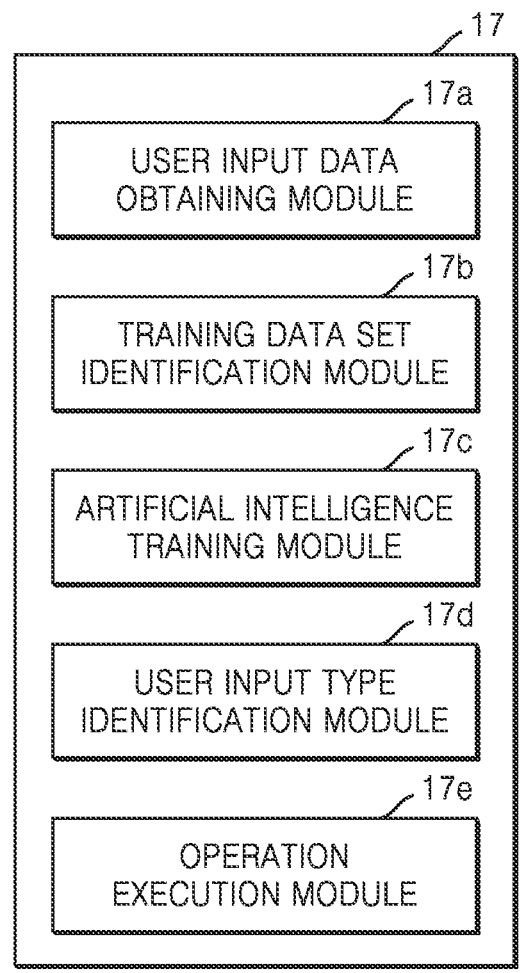
FIG. 14 is a block diagram illustrating software modules of a memory included in an electronic device according to an embodiment.

FIG. 14 is a block diagram illustrating software modules of a memory included in an electronic device according to an embodiment.

Referring to FIG. 14, the memory 17 is a software module including instructions for the electronic device 10 to perform the embodiments described above with reference to FIGS. 1-12, and may include the user input data obtaining module 17a, the training data set identification module 17b, the artificial intelligence training module 17c, the user input type identification module 17d, and the operation execution module 17e. However, the electronic device 10 may perform an operation corresponding to an input of the user by more or less software modules than those illustrated in FIG. 14.

For example, as the processor 13 executes an instruction included in the user input data obtaining module 17a, the electronic device 10 may obtain at least one of touch data and air pressure data from a touch input received from the user. The descriptions of the embodiments provided above with reference to FIGS. 1-12 will be omitted.

As another example, as the processor 13 executes an instruction included in the training data set identification module 17b, the electronic device 10 may select a training data set similar to input data of the user from among a plurality of pre-stored training data sets. The descriptions of the embodiments provided above with reference to FIGS. 1-12 will be omitted.

As another example, as the processor 13 executes an instruction included in the artificial intelligence training module 17c, the electronic device 10 may train an artificial intelligence model based on a training data set similar to input data of the user, or identify an artificial intelligence model trained based on the training data set similar to input data of the user. The descriptions of the embodiments provided above with reference to FIGS. 1-12 will be omitted.

As example, as the processor 13 executes an instruction included in the user input type identification module 17d, the electronic device 10 may identify the type of a user input received from the user. The descriptions of the embodiments provided above with reference to FIGS. 1-12 will be omitted.

As another example, as the processor 13 executes an instruction included in the operation execution module 17e, the electronic device 10 may perform an operation corresponding to the identified type of the user input. The descriptions of the embodiments provided above with reference to FIGS. 1-12 will be omitted.

Figure 15:
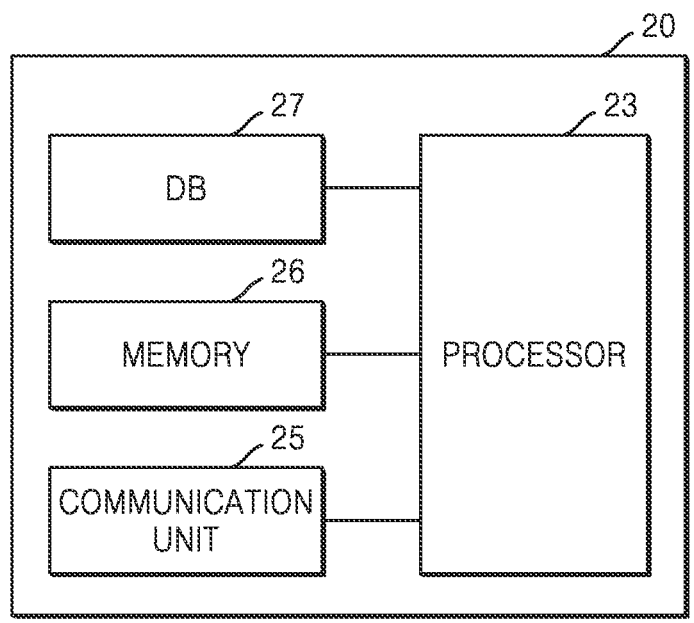
FIG. 15 is a block diagram of a server according to an embodiment.

FIG. 15 is a block diagram of a server according to an embodiment.

Referring to FIG. 15, a server 20 according to some embodiments may include a communication unit 25, a memory 26, a DB 27, and a processor 23.

The communication unit 25 may include one or more components configured to allow the server 20 to communicate with the electronic device 10.

The memory 26 may store at least one instruction and at least one program for the processor 23 to perform processing and control, and may store data input to or output from the server 20.

The DB 27 may store data received from the electronic device 10. The DB 27 may store a plurality of training data sets to be used to train an artificial intelligence model.

The processor 23 controls the overall operation of the server 20. For example, the processor 23 may execute programs stored in the memory 26 of the server 20 to control the overall operation of the DB 27 and the communication unit 25. The processor 23 may execute programs to perform the operations of the server 20 described above with reference to FIGS. 1-12.

For example, the processor 23 may execute an instruction stored in a training data set identification module 27a to identify a training data set similar to input data of the user from among a plurality of pre-stored training data sets. The descriptions of the embodiments provided above with reference to FIGS. 1-12 will be omitted.

As another example, the processor 23 may execute an instruction included in an artificial intelligence training module 27b to train an artificial intelligence model based on a training data set similar to input data of the user. Alternatively, the processor 23 may execute the instruction stored in an artificial intelligence training module 27b to select an artificial intelligence model trained based on a training data set similar to input data of the user. The descriptions of the embodiments provided above with reference to FIGS. 1-12 will be omitted.

Figure 16:
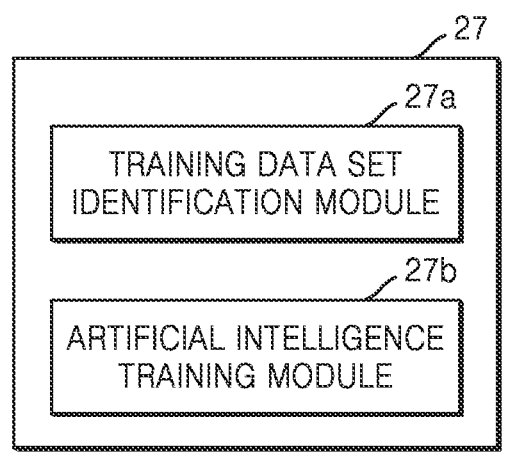
FIG. 16 is a block diagram illustrating software modules of a memory included in a server, according to an embodiment.

FIG. 16 is a block diagram illustrating software modules of a memory included in a server, according to an embodiment.

Referring to FIG. 16, the memory 26 is a software module for the server 20 to perform the embodiments described above with reference to FIGS. 1-12, and may include the training data set identification module 27a and the artificial intelligence training module 27b. However, the server 20 may operate by more or less software modules than those illustrated in FIG. 16.

For example, as the processor 23 executes an instruction included in the training data set identification module 27a, the server 20 may select a training data set similar to input data of the user from among a plurality of pre-stored training data sets. The descriptions of the embodiments provided above with reference to FIGS. 1-12 will be omitted.

As another example, as the processor 23 executes an instruction included in the artificial intelligence training module 27b, the server 20 may train an artificial intelligence model based on a training data set similar to input data of the user, or identify an artificial intelligence model trained based on the training data set similar to input data of the user. The descriptions of the embodiments provided above with reference to FIGS. 1-12 will be omitted.

According to an embodiment, a machine-readable storage medium may be provided in the form of a non-transitory storage medium. Here, the term 'non-transitory storage medium' refers to a tangible device and does not include a signal (e.g., an electromagnetic wave), and the term 'non-transitory storage medium' does not distinguish between a case where data is stored in a storage medium semi-permanently and a case where data is stored temporarily. For example, the non-transitory storage medium may include a buffer in which data is temporarily stored.

According to an embodiment, the methods according to various embodiments disclosed herein may be included in a computer program product and then provided. The computer program products may be traded as commodities between sellers and buyers. The computer program product may be distributed in the form of a machine-readable storage medium (e.g., a compact disc ROM (CD-ROM)), or may be distributed online (e.g., downloaded or uploaded) through an application store (e.g., Play Store™) or directly between two user devices (e.g., smart phones). In a case of online distribution, at least a portion of the computer program product (e.g., a downloadable app) may be temporarily stored in a machine-readable storage medium such as a manufacturers server, an application store's server, or a memory of a relay server.

The embodiments of the disclosure have been shown and described above with reference to the accompanying drawings. The embodiments disclosed in the specification and drawings are only intended to provide specific examples for easily describing the technical content of the disclosure and for assisting understanding of the disclosure, and are not intended to limit the scope of the disclosure. It will be understood by those of ordinary skill in the art that the disclosure may be easily modified into other detailed forms without changing the technical principle or essential features of the disclosure, and without departing from the gist of the disclosure as claimed by the appended claims and their equivalents. Therefore, it should be interpreted that the scope of the disclosure includes all changes or modifications derived based on the technical idea of the disclosure in addition to the embodiments disclosed herein.

What is claimed is:

1. A method performed by an electronic device, the method comprising:
    obtaining touch data related to a touch input of a user, wherein the touch data includes data indicating at least one of a time interval during which the touch input is received or an area of a region of the touch input;
    obtaining a feature vector from air pressure data by applying the air pressure data to an artificial intelligence model, the air pressure data being related to a change in air pressure inside the electronic device caused by the touch input of the user;
    selecting a first training data set from among a plurality of pre-stored training data sets, the first training data set selected based on a similarity between the at least one of the time interval or the area of the region of the touch data and at least one of a time interval or an area of a region of a touch input of each of the plurality of pre-stored training data sets and selected based on a result of comparing the feature vector obtained from the air pressure data with a plurality of feature vectors obtained from air pressure data included in the plurality of pre-stored training data sets, respectively;
    training the artificial intelligence model based on the first training data set;
    identifying a type of a user input that is input to the electronic device, based on the trained artificial intelligence model; and
    performing an operation corresponding to the identified type of the user input.

2. The method of claim 1, wherein the selecting the first training data set comprises:
    obtaining a first feature vector from the touch data by applying the touch data to the artificial intelligence model; and
    selecting the first training data set based on a result of comparing the first feature vector with a second feature vector of each of the plurality of pre-stored training data sets.

3. The method of claim 1, wherein the selecting the first training data set comprises:
    transmitting, to a server, at least one of the touch data and a first feature vector obtained from the touch data; and
    receiving, from the server, information about the first training data set that is selected based on the at least one of the touch data and the first feature vector, and
    wherein the training the artificial intelligence model comprises training the artificial intelligence model based on the information about the first training data set.

4. The method of claim 3, wherein the receiving the information about the first training data set from the server comprises:
    receiving, from the server, the first training data set, and
    wherein training the artificial intelligence model comprises training the artificial intelligence model based on the first training data set.

5. The method of claim 1, wherein the selecting the first training data sets comprises transmitting, to a server, at least one of the touch data and a first feature vector obtained from the touch data, and wherein the training the artificial intelligence model comprises receiving, from the server, the artificial intelligence model trained based on the first training data set.

6. An electronic device comprising:
    a memory configured to store at least one instruction;
    a user input interface configured to receive a touch input of a user;
    an air pressure sensor configured to obtain air pressure data related to a change in air pressure inside the electronic device caused by the touch input of the user, and
    at least one processor configured to execute the at least one instruction to:
        obtain touch data related to the touch input of the user, wherein the touch data includes data indicating at least one of a time interval during which the touch input is received or an area of a region of the touch input,
        obtain a feature vector from the air pressure data by applying the air pressure data to an artificial intelligence model, and
        select a first training data set from among a plurality of pre-stored training data sets, the first training data set selected based on a similarity between the at least one of the time interval or the area of the region of the touch data and at least one of a time interval or an area of a region of a touch input of each of the plurality of pre-stored training data sets and selected based on a result of comparing the feature vector obtained from the air pressure data with a plurality of feature vectors obtained from air pressure data included in the plurality of pre-stored training data sets, respectively,
        train the artificial intelligence model based on the first training data set,
        identify a type of a user input that is input to the electronic device, based on the trained artificial intelligence model, and
        control the electronic device to perform an operation corresponding to the identified type of the user input.

7. The electronic device of claim 6, wherein the at least one processor is further configured to execute the at least one instruction to:

obtain a first feature vector from the touch data by applying the touch data to the artificial intelligence model; and select the first training data set based on a result of comparing the first feature vector with a second feature vector of each of the plurality of pre-stored training data sets.

8. The electronic device of claim 6, further comprising:
a communication interface configured to transmit and receive data to and from a server,
wherein the at least one processor is further configured to execute the at least one instruction to:
control the communication interface to transmit, to the server, at least one of the touch data and a first feature vector obtained from the touch data,
receive, from the server through the communication interface, information about the first training data set that is selected based on the at least one of the touch data and the first feature vector, and
train the artificial intelligence model based on the information about the first training data set.

9. The electronic device of claim 8, wherein the at least one processor is further configured to execute the at least one instruction to:
control the communication interface to receive the first training data set from the server, and
train the artificial intelligence model based on the first training data set.

10. The electronic device of claim 6, further comprising:
a communication interface configured to transmit and receive data to and from a server,
wherein the at least one processor is further configured to execute the at least one instruction to:
control the communication interface to transmit, to the server, at least one of the touch data and a first feature vector obtained from the touch data, and
receive, from the server through the communication interface, an artificial intelligence model trained based on the first training data set.

11. A non-transitory computer readable medium for storing computer readable program code or instructions which are executable by a at least one processor to perform a method for allowing an electronic device to perform an operation corresponding to a user input based on an artificial intelligence model, the method comprising:
obtaining touch data related to a touch input of a user, wherein the touch data includes data indicating at least one of a time interval during which the touch input is received or an area of a region of the touch input;
obtaining a feature vector from air pressure data by applying the air pressure data to an artificial intelligence model, the air pressure data being related to a change in air pressure inside the electronic device caused by the touch input of the user;
selecting a first training data set from among a plurality of pre-stored training data sets, the first training data set selected based on a similarity between the at least one of the time interval or the area of the region of the touch data and at least one of a time interval or an area of a region of a touch input of each of the plurality of pre-stored training data sets and selected based on a result of comparing the feature vector obtained from the air pressure data with a plurality of feature vectors obtained from air pressure data included in the plurality of pre-stored training data sets, respectively;
training the artificial intelligence model based on the first training data set;
identifying a type of a user input that is input to the electronic device, based on the trained artificial intelligence model; and
performing an operation corresponding to the identified type of the user input.

12. The non-transitory computer readable medium of claim 11, wherein the selecting the first training data set comprises:
obtaining a first feature vector from the touch data by applying the touch data to the artificial intelligence model; and
selecting the first training data set based on a result of comparing the first feature vector with a second feature vector of each of the plurality of pre-stored training data sets.

13. The non-transitory computer readable medium of claim 11, wherein the selecting the first training data set comprises:
transmitting, to a server, at least one of the touch data and a first feature vector obtained from the touch data; and
receiving, from the server, information about the first training data set based on the at least one of the touch data and the first feature vector, wherein the training the artificial intelligence model comprises training the artificial intelligence model based on the information about the first training data set.

14. The non-transitory computer readable medium of claim 13, wherein the receiving the information about the first training data set from the server comprises:
receiving, from the server, the first training data set,
wherein training the artificial intelligence model comprises training the artificial intelligence model based on the first training data set.

15. The non-transitory computer readable medium of claim 11, wherein the selecting the first training data set comprises transmitting, to a server, at least one of the touch data and a first feature vector obtained from the touch data, and the training the artificial intelligence model comprises receiving, from the server, the artificial intelligence model trained based on the first training data set.

* * * * *